US011447928B2

(12) United States Patent
Hatake et al.

(10) Patent No.: US 11,447,928 B2
(45) Date of Patent: Sep. 20, 2022

(54) DISPLAY SYSTEM, DISPLAY METHOD, AND REMOTE CONTROL SYSTEM

(71) Applicant: Komatsu Ltd., Tokyo (JP)

(72) Inventors: Kazuhiro Hatake, Tokyo (JP); Yukinori Matsumura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 297 days.

(21) Appl. No.: 16/487,466

(22) PCT Filed: Feb. 23, 2018

(86) PCT No.: PCT/JP2018/006777
§ 371 (c)(1),
(2) Date: Aug. 21, 2019

(87) PCT Pub. No.: WO2018/220914
PCT Pub. Date: Dec. 6, 2018

(65) Prior Publication Data
US 2020/0063397 A1 Feb. 27, 2020

(30) Foreign Application Priority Data
May 31, 2017 (JP) .............................. JP2017-108823

(51) Int. Cl.
E02F 9/20 (2006.01)
E02F 9/26 (2006.01)
B60R 1/00 (2022.01)

(52) U.S. Cl.
CPC ................ E02F 9/205 (2013.01); B60R 1/00 (2013.01); E02F 9/2004 (2013.01); E02F 9/26 (2013.01);
(Continued)

(58) Field of Classification Search
CPC . E02F 9/205; E02F 9/2004; E02F 9/26; E02F 3/32; E02F 9/261; B60R 1/00;
(Continued)

(56) References Cited

U.S. PATENT DOCUMENTS 9,733,080 B2 8/2017 Ohtomo et al.
2012/0162360 A1 6/2012 Ohtomo et al.
(Continued)

FOREIGN PATENT DOCUMENTS

JP H08-192987 A 7/1996
JP 2000-13521 A 1/2000
(Continued)

OTHER PUBLICATIONS

Japanese Decision to Grant a Patent dated Jun. 22, 2021, issued in the corresponding Japanese patent application No. 2017-108823 and English translation thereof.
(Continued)

Primary Examiner — Sath V Perungavoor
Assistant Examiner — Tyler B Edwards
(74) Attorney, Agent, or Firm — Locke Lord LLP

(57) ABSTRACT

A display system includes: an image data acquisition unit that acquires a front image and a side image captured by an imaging device mounted on a work machine having a swing body swinging about a swing axis and working equipment supported by the swing body, the front image including at least an image in a front direction with respect to the swing axis, the side image including at least an image in a lateral direction to the swing axis, the lateral direction being orthogonal to the front direction; and a display control unit that displays the front image and the side image acquired by the image data acquisition unit on a display device existing outside the work machine.

6 Claims, 10 Drawing Sheets

(52) U.S. Cl.
CPC ... *B60R 2300/105* (2013.01); *B60R 2300/207* (2013.01); *B60R 2300/303* (2013.01)

(58) Field of Classification Search
CPC ........ B60R 2300/105; B60R 2300/207; B60R 2300/303; G05D 2201/0202; G05D 1/0038; H04M 11/00; H04N 7/18; H04Q 9/00
See application file for complete search history.

(56) References Cited

U.S. PATENT DOCUMENTS

| | | | |
|---|---|---|---|
| 2013/0169469 A1* | 7/2013 | Mitsuta | G01S 13/867 348/148 |
| 2016/0006947 A1 | 1/2016 | Kowatari et al. | |
| 2017/0284069 A1 | 10/2017 | Machida et al. | |
| 2018/0073214 A1* | 3/2018 | Tsukamoto | E02F 3/815 |
| 2018/0080199 A1* | 3/2018 | Deguchi | E02F 9/26 |

FOREIGN PATENT DOCUMENTS

| | | | | |
|---|---|---|---|---|
| JP | 2006-219894 A | | 8/2006 | |
| JP | 2009-17453 A | | 1/2009 | |
| JP | 2011-82598 A | | 4/2011 | |
| JP | 2013-116773 A | | 6/2013 | |
| JP | 2013-168776 A | | 8/2013 | |
| JP | 2015-021246 A | | 2/2015 | |
| JP | 2015021246 A | * | 2/2015 | ............... B60R 1/00 |
| JP | 2016-52008 A | | 4/2016 | |
| JP | 2016-194237 A | | 11/2016 | |
| JP | 2017-092908 A | | 5/2017 | |
| JP | 2017092908 A | * | 5/2017 | |
| WO | 2014/123228 A1 | | 8/2014 | |
| WO | 2015/008751 A1 | | 1/2015 | |
| WO | 2016/159012 A1 | | 10/2016 | |

OTHER PUBLICATIONS

International Search Report dated May 15, 2018, issued for PCT/JP2018/006777.

* cited by examiner

DISPLAY SYSTEM, DISPLAY METHOD, AND REMOTE CONTROL SYSTEM

FIELD

The present invention relates to a display system, a display method, and a remote control system.

BACKGROUND

A technique of remotely operating a work machine is known as disclosed in Patent Literature 1. When remotely operating the work machine, a work site is captured by a camera mounted on the work machine. An image of the work site captured by the camera is displayed on a display device provided in a remote control facility. An operator operates a remote control device while viewing the image of the work site displayed on the display device.

CITATION LIST

Patent Literature

Patent Literature 1: Japanese Patent Application Laid-Open No. 2013-168776 A

SUMMARY

Technical Problem

When excavation work and loading work are carried out with a work machine including a swing body such as an excavator and working equipment supported by the swing body, in general, an excavation object is positioned in a front direction of the swing body and a transporter vehicle such as a dump truck is positioned in a lateral direction of the swing body. The work machine excavates the excavation object existing in the front direction of the swing body with the working equipment, and then, swings the swing body at substantially 90 degrees to load an excavated object on the transporter vehicle. Such an operation of the work machine is referred to as 90-degree-swing excavation and loading work. In the case of carrying out the 90-degree-swing excavation and loading work by remote control, the operator is likely to feel uncomfortable if an image of the transporter vehicle is not displayed on the display device when the excavation object is positioned in the front direction of the swing body and the image of the transporter vehicle suddenly appears on the display device after the start of swinging of the swing body. In addition, if the image of the transporter vehicle is not displayed on the display device when the excavation object is positioned in the front direction of the swing body, a swing operation is started without recognizing a position of the transporter vehicle, which serves as a target stop position in the swinging of the swing body so that the operator is likely feel anxious about swinging the swing body. When the operator feels uncomfortable or anxious, there is a high possibility of operating the remote control device to swing the swing body at a low speed. The decrease in speed of swinging of the swing body results in a decrease in working efficiency.

An aspect of the present invention aims to provide a technique that is capable of allowing an operator to remotely operate a work machine with comfort and suppressing a decrease in work efficiency.

Solution to Problem

According to an aspect of the present invention, a display system comprises: an image data acquisition unit that acquires a front image and a side image captured by an imaging device mounted on a work machine having a swing body swinging about a swing axis and working equipment supported by the swing body, the front image including at least an image in a front direction with respect to the swing axis, the side image including at least an image in a lateral direction to the swing axis, the lateral direction being orthogonal to the front direction; and a display control unit that displays the front image and the side image acquired by the image data acquisition unit on a display device existing outside the work machine.

Advantageous Effects of Invention

According to an aspect of this invention, provided is the technique capable of allowing the operator to remotely operate the work machine with comfort and suppressing the decrease in working efficiency.

DESCRIPTION OF EMBODIMENTS

Hereinafter, embodiments of the present invention will be described with reference to the drawings, but the present invention is not limited thereto. Components of the embodiments described below can be combined as appropriate. In addition, there is also a case where some components are not used.

First Embodiment

[Remote Control System]

Figure 1:
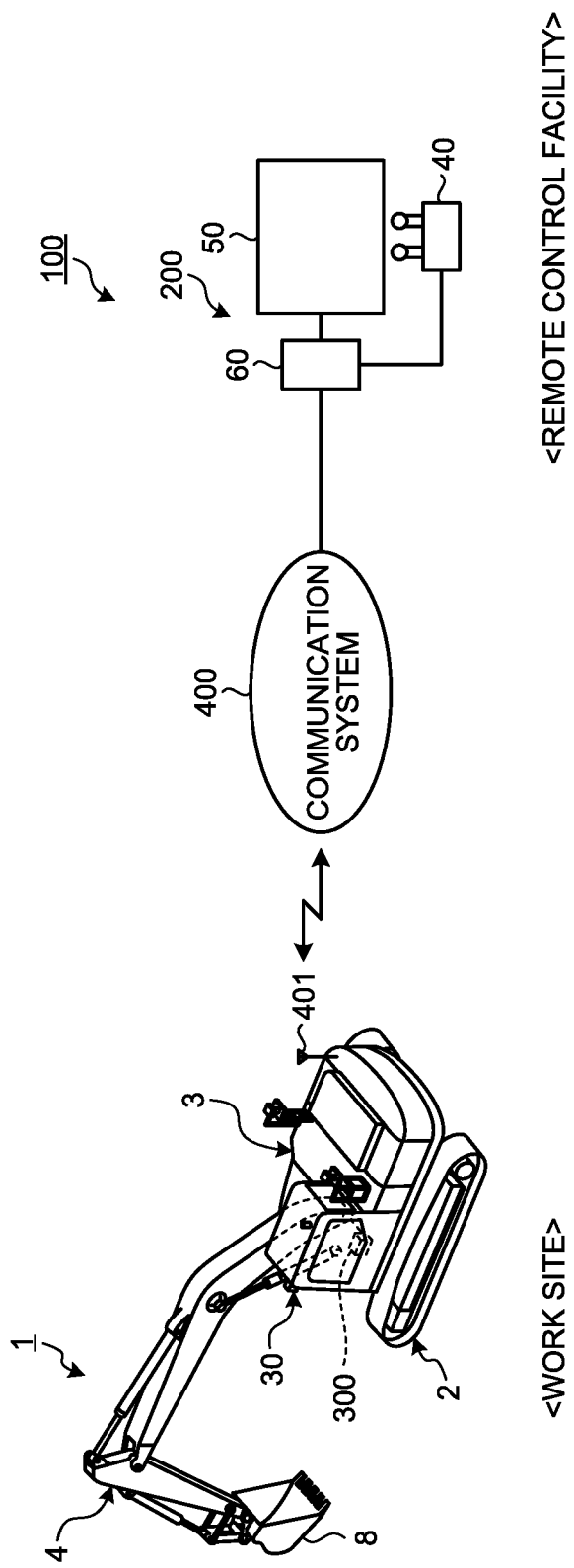
FIG. 1 is a diagram schematically illustrating an example of a remote control system of a work machine according to a first embodiment.

FIG. 1 is a diagram schematically illustrating an example of a remote control system 100 of a work machine 1 according to the present embodiment. In the present embodiment, the work machine 1 is an excavator. In the following description, the work machine 1 is appropriately referred to as the excavator 1.

The excavator 1 includes a travel body 2, a swing body 3 swingably supported by the travel body 2, and working equipment 4 supported by the swing body 3. The excavator 1 exists at a work site and works at the work site.

The remote control system 100 includes a remote control device 40 provided in a remote control facility existing outside the excavator 1. The excavator 1 is remotely operated by the remote control device 40.

The remote control system 100 has a display system 200 that displays an image of an object existing at the work site in the remote control facility. The display system 200 includes a display device 50 existing outside the excavator 1 and a control device 60 which exists outside the excavator 1 and is capable of communicating with the excavator 1. Each of the remote control device 40, the display device 50, and the control device 60 is arranged in the remote control facility. Each of the remote control device 40, the display device 50, and the control device 60 is provided as a separate body from the excavator 1.

In addition, the display system 200 also includes an imaging device 30 which is mounted on the excavator 1 and captures the object existing at the work site. The imaging device 30 is mounted on the swing body 3. The object to be captured by the imaging device 30 includes a construction object to be constructed at the work site. The construction object includes an excavation object to be excavated by the working equipment 4 of the excavator 1. Incidentally, the construction object may be a construction object to be constructed by a work machine different from the excavator 1, or may be a construction object to be constructed by a worker. In addition, the construction object is a concept including a construction object before construction, a construction object under construction, and a construction object after construction.

In addition, the object to be captured by the imaging device 30 includes at least a part of the excavator 1. The excavator 1, which is the object to be captured by the imaging device 30, includes at least a part of the working equipment 4. The working equipment 4, which is the object to be captured by the imaging device 30, may be the working equipment 4 in the state of performing an excavation operation or may be the working equipment 4 in the state of not performing the excavation operation. In addition, the excavator 1, which is the object to be captured by the imaging device 30, may be at least a part of the travel body 2.

In addition, the object to be captured by the imaging device 30 includes a work machine arranged around the excavator 1 to be remotely operated. The work machine, which is the object to be captured by the imaging device 30, includes a dump truck which is a transporter vehicle. Incidentally, the work machine, which is the object to be captured by the imaging device 30, may be an excavator different from the excavator 1 to be remotely operated.

The excavator 1 mounts a control device 300. The control device 300 and the control device 60 communicate with each other via a communication system 400. The communication system 400 has a wireless communication device 401 mounted on the excavator 1. The communication system 400 includes at least one of the Internet, a local area network (LAN), a mobile telephone communication network, and a satellite communication network.

The remote control device 40 includes a work lever, which remotely operates the working equipment 4 and the swing body 3 of the excavator 1, and a travel lever which remotely operates the travel body 2. An operator operates the remote control device 40 in the remote control facility. An operation signal generated by operating the remote control device 40 is transmitted to the control device 300 via the communication system 400. The control device 300 includes a computer system. The control device 300 includes: an arithmetic processing device including a processor such as a central processing unit (CPU); a storage device including a volatile memory such as a random access memory (RAM) and a nonvolatile memory such as a read only memory (ROM); and an input/output interface. The control device 300 outputs a control signal to control the working equipment 4, the swing body 3, and the travel body 2 based on the operation signal. As a result, the excavator 1 is remotely operated.

The display device 50 displays an object existing at the work site captured by the imaging device 30. The display device 50 has a plurality of display screens adjacent to each other (a front display screen 51S, a first side display screen 52S, a second side display screen 53S, an upper side display screen 54S, and a lower side display screen 55S) as will be described below with reference to FIG. 5. The plurality of display screens of the display device 50 are arranged so as to surround the operator sitting on a control seat 45 provided in the remote control facility in order for the operator existing in the remote control facility to feel a sense of actually riding on a cab of the excavator 1. On each of the plurality of display screens, an image corresponding to a view of the operator when actually riding on the cab of the excavator 1 is displayed. On the front display screen 51S, a front image corresponding to the view in a front direction of the operator when actually riding on the cab of the excavator 1 is displayed. On the first side display screen 52S, a first side image corresponding to a view in a left direction of the operator when actually riding on the cab of the excavator 1 is displayed. On the second side display screen 53S, a second side image corresponding to a view in a right direction of the operator when actually riding on the cab of the excavator 1 is displayed. On the upper side display screen 54S, an upper side image corresponding to a view in an obliquely upward direction of the front direction of the operator when actually riding on the cab of the excavator 1 is displayed. On the lower side display screen 55S, a lower side image corresponding to a view in an obliquely downward direction of the front direction of the operator when actually riding on the cab of the excavator 1 is displayed. As the images corresponding to the view in the front direction, the view in the left direction, the view in the right direction, the view in the obliquely upward direction of the front direction, and the view in the obliquely downward direction of the front direction are displayed on the display device 50, the operator existing in the remote control facility can feel the sense of actually riding on the cab of the excavator 1. As a result, the operability of remote control is improved.

[Excavator]

Figure 2:
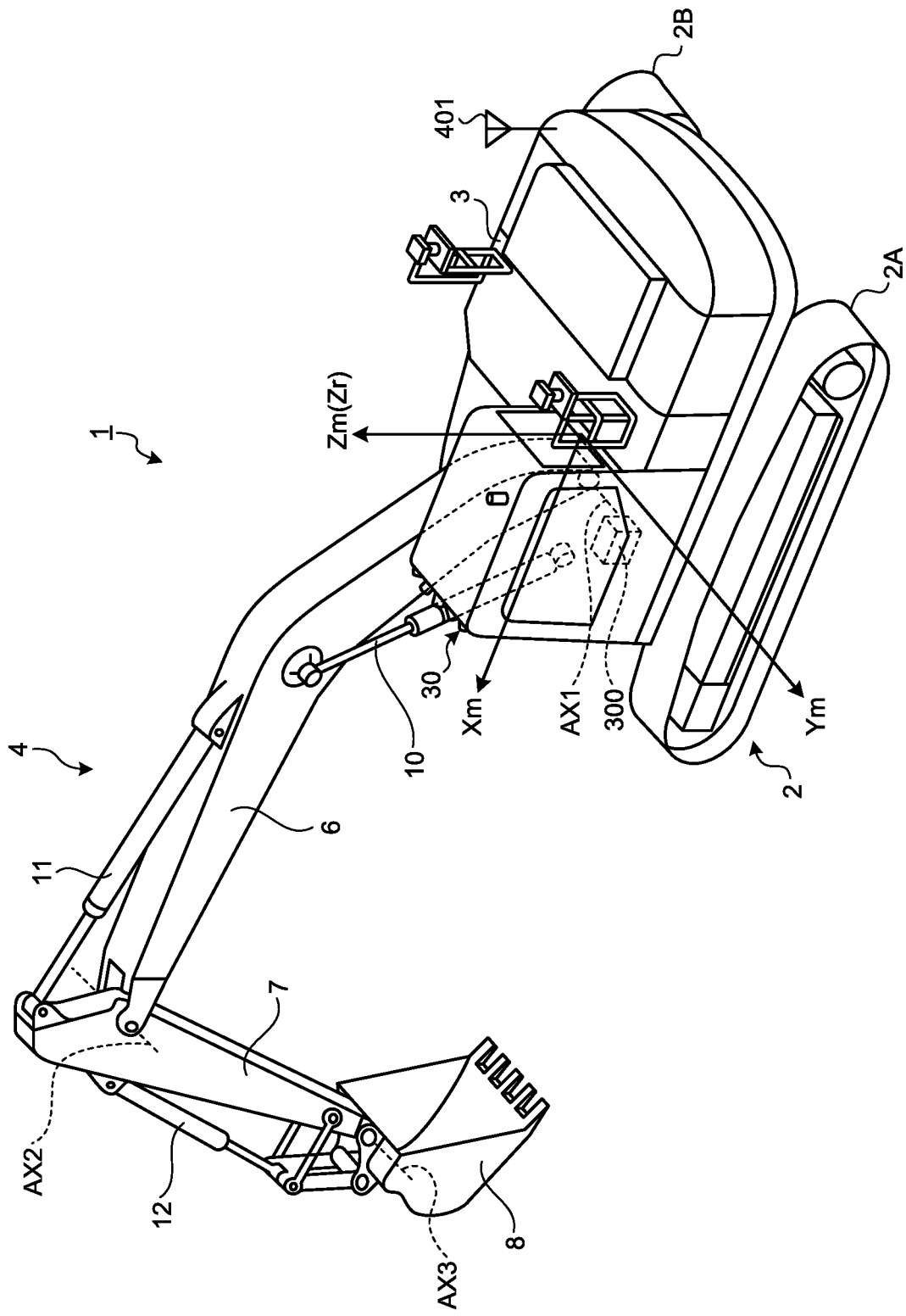
FIG. 2 is a perspective view schematically illustrating an example of the work machine according to the first embodiment.

FIG. 2 is a perspective view schematically illustrating an example of the excavator 1 according to the present embodiment. In the following description, a three-dimensional vehicle body coordinate system (Xm, Ym, Zm) will be defined, and a positional relationship of each unit will be described. The vehicle body coordinate system is defined by an Xm axis of a predetermined plane with an origin defined as the swing body 3 of the excavator 1 as a reference, a Ym axis orthogonal to the Xm axis in the predetermined plane, and a Zm axis orthogonal to the predetermined plane. A direction parallel to the Xm axis is set as an Xm-axis direction, a direction parallel to the Ym axis is set as a Ym-axis direction, and a direction parallel to the Zm axis is set as a Zm-axis direction. The Xm-axis direction is a front-rear direction of the swing body 3, the Ym-axis direction is a left-right direction (lateral direction) of the swing body 3, and the Zm-axis direction is a vertical direction of the swing body 3.

The excavator 1 includes a travel body 2, a swing body 3 swingably supported by the travel body 2, and working equipment 4 supported by the swing body 3.

The travel body 2 has crawler belts 2A and 2B. The excavator 1 travels as the crawler belts 2A and 2B rotate. The Zm axis of the vehicle body coordinate system is orthogonal to ground contact surfaces of the crawler belts 2A and 2B. A +Zm direction of the vehicle body coordinate system is an upward direction of the swing body 3 and is a direction away from the ground contact surfaces of the crawler belts 2A and 2B. A −Zm direction of the vehicle body coordinate system is a downward direction of the swing body 3 and is a direction opposite to the +Zm direction.

The swing body 3 is swingable about a swing axis Zr. The swing axis Zr is parallel to the Zm axis of the vehicle coordinate system. The origin of the vehicle body coordinate system is defined at a center of a swing circle of the swing body 3. The center of the swing circle is located on the swing axis Zr of the swing body 3.

The working equipment 4 is coupled to the swing body 3. In the vehicle body coordinate system, at least a part of the working equipment 4 is arranged in a +Xm direction with respect to the swing body 3. The +Xm direction of the vehicle body coordinate system is the front direction of the swing body 3 and is a direction where a distal end portion of the working equipment 4 is present with the swing body 3 as a reference. The distal end portion of the working equipment 4 includes a bucket 8. A −Xm direction of the vehicle body coordinate system is a rear direction of the swing body 3 and is a direction opposite to the +Xm direction.

The working equipment 4 includes a boom 6 coupled to the swing body 3, an arm 7 coupled to the boom 6, a bucket 8 coupled to the arm 7, a boom cylinder 10 driving the boom 6, an arm cylinder 11 driving the arm 7, and a bucket cylinder 12 driving the bucket 8. The boom cylinder 10, the arm cylinder 11, and the bucket cylinder 12 are hydraulic cylinders driven by hydraulic pressure.

The boom 6 is coupled to the swing body 3 to be rotatable about a rotation axis AX1. The arm 7 is coupled to a distal end portion of the boom 6 to be rotatable about a rotation axis AX2. The bucket 8 is coupled to a distal end portion of the arm 7 to be rotatable about a rotation axis AX3. The rotation axis AX1 of the boom 6, the rotation axis AX2 of the arm 7, and the rotation axis AX3 of the bucket 8 are parallel to the Ym axis of the vehicle coordinate system. A +Ym direction of the vehicle body coordinate system is a first lateral direction of the swing body 3 and is the left direction of the swing body 3. A −Ym direction of the vehicle body coordinate system is a second lateral direction of the swing body 3, is a direction opposite to the +Ym direction, and is the right direction of the swing body 3.

[Camera]

Figure 3:
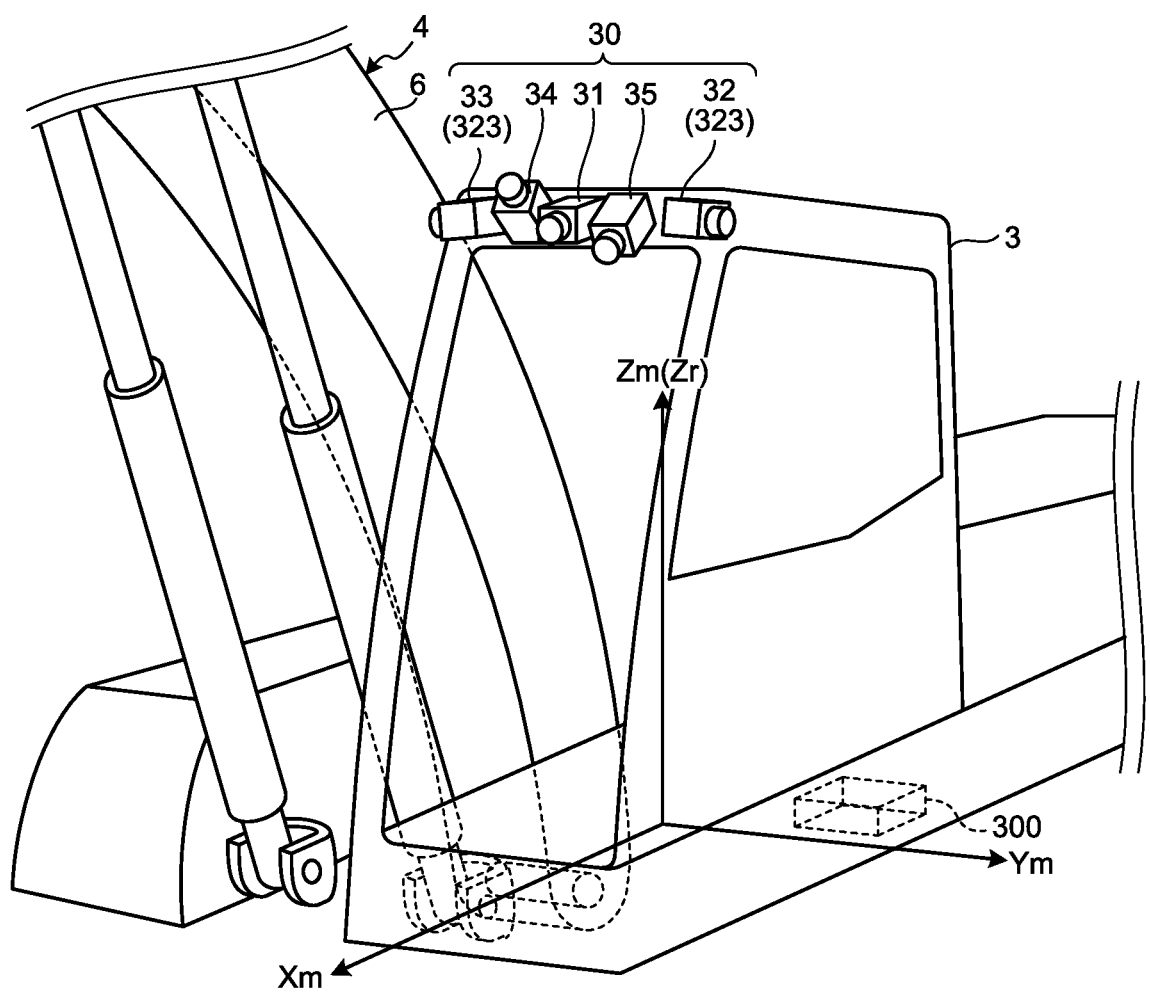
FIG. 3 is a perspective view illustrating an example of a camera according to the first embodiment.

FIG. 3 is a perspective view illustrating an example of the imaging device 30 according to the present embodiment. As illustrated in FIG. 3, the excavator 1 has the imaging device 30. The imaging device 30 is provided at a front portion of the swing body 3.

The imaging device 30 includes an optical system and an image sensor that receives light passing through the optical system. The image sensor includes a couple charged device (CCD) image sensor or a complementary metal oxide semiconductor (CMOS) image sensor.

The imaging device 30 acquires an image of an object at a work site. In the present embodiment, the imaging device 30 acquires an image of an object existing at a work site.

The imaging device 30 simultaneously captures a front image of the swing body 3 in the front direction (+Xm direction) and a side image of the swing body 3 in the lateral direction (Ym-axis direction) orthogonal to the +Xm direction in a predetermined plane orthogonal to the swing axis Zr of the swing body 3. The lateral direction (Ym-axis direction) includes one first lateral direction (+Ym direction) and the second lateral direction (−Ym direction) opposite to the first lateral direction. The side image includes a first side image of the swing body 3 in the first lateral direction and a second side image of the swing body 3 in the second lateral direction. The imaging device 30 simultaneously captures the front image, the first side image, and the second side image.

In the present embodiment, the imaging device 30 includes a front camera 31 that captures the front direction of the swing body 3 and a side camera 323 that captures the lateral direction of the swing body 3. The side camera 323 includes a first side camera 32 that captures the first lateral direction of the swing body 3 and a second side camera 33 that captures the second lateral direction of the swing body 3.

In addition, in the present embodiment, the imaging device 30 includes an upper side camera 34 which captures the obliquely upward direction of the front direction of the swing body 3 and a lower side camera 35 which captures the obliquely downward direction of the front of the swing body 3.

The front camera 31, the first side camera 32, the second side camera 33, the upper side camera 34, and the lower side camera 35 simultaneously capture objects existing at a work site. That is, capturing in the front direction of the swing body 3 by the front camera 31, capturing in the left direction of the swing body 3 by the first side camera 32, capturing in the right direction of the swing body 3 by the second side camera 33, capturing in the obliquely upward direction of the front direction of the swing body 3 by the upper side camera 34, and capturing in the obliquely downward direction of the front direction of the swing body 3 by the lower side camera 35 are simultaneously performed.

The front camera 31 is provided at the front portion in an upper portion of the swing body 3. The front image taken by the front camera 31 is an image of a front space FS in the front direction of the swing body 3 that includes the distal end portion of the working equipment 4.

The first side camera 32 is provided at the front portion in the upper portion of the swing body 3. The first side camera 32 is provided on the left side (+Ym side) of the front camera 31. The first side camera 32 is arranged with an interval from the front camera 31. The front camera 31 and the first side camera 32 are arranged at substantially the same position in the Zm-axis direction. The first side image captured by the first side camera 32 is an image of a first side space SS1 in the left direction of the swing body 3 that does not include the working equipment 4.

The second side camera 33 is provided at the front portion in the upper portion of the swing body 3. The second side camera 33 is provided on the right side (−Ym side) of the front camera 31. The second side camera 33 is arranged with an interval from the front camera 31. The front camera 31 and the second side camera 33 are arranged at substantially the same position in the Zm-axis direction. The second side image captured by the second side camera 33 is an image of a second side space SS2 in the right direction of the swing body 3 that includes a proximal end portion of the working equipment 4. The proximal end portion of the working equipment 4 includes the boom 6.

The upper side camera 34 is provided at the front portion in the upper portion of the swing body 3. The upper side image captured by the upper side camera 34 is an image of an upper side space in the obliquely upward direction of the front direction of the swing body 3 that includes at least a part of the working equipment 4.

The lower side camera 35 is provided at the front portion in the upper portion of the swing body 3. The lower side image captured by the lower side camera 35 is an image of a lower side space in the obliquely downward direction of the front direction of the swing body 3 that includes at least a part of the travel body 2.

[Capturing Area of Camera]

Figure 4:
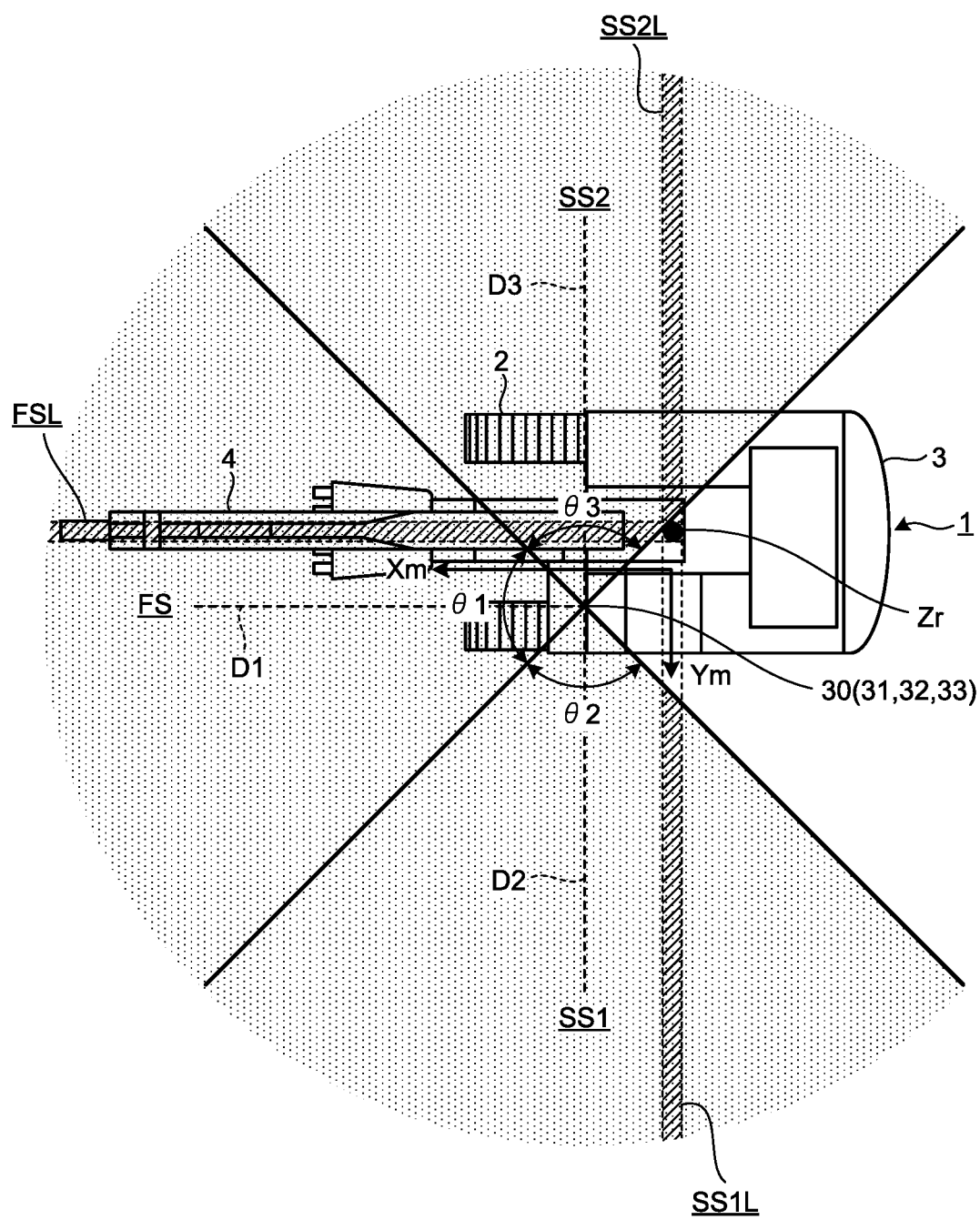
FIG. 4 is a schematic view for describing a capturing area of the camera according to the first embodiment.

FIG. 4 is a schematic view for describing the capturing area of the imaging device 30 according to the present embodiment. FIG. 4 is a schematic view of the excavator 1 as viewed from above, and illustrates the respective capturing areas of the front camera 31, the first side camera 32, and the second side camera 33. Incidentally, FIG. 4 schematically illustrates a state where the front camera 31, the first side camera 32, and the second side camera 33 are provided at the same position for convenience.

As illustrated in FIG. 4, the front camera 31 captures the front image which is the image of the front space FS in the front direction (+Xm direction) of the swing body 3 that includes the distal end portion of the working equipment 4. An optical axis D1 of the optical system of the front camera 31 is substantially parallel to the Xm axis.

The first side camera 32 captures the first side image which is the image of the first side space SS1 in the first lateral direction (+Ym direction) of the swing body 3 that does not include the working equipment 4. An optical axis D2 of the optical system of the first side camera 32 is substantially parallel to the Ym axis.

The second side camera 33 captures the second side image which is the image of the second side space SS2 in the second lateral direction (–Ym direction) of the swing body 3 that includes the proximal end portion of the working equipment 4. An optical axis D3 of the optical system of the second side camera 33 is substantially parallel to the Ym axis.

The front image includes at least an image of a local front space FSL in the front direction (+Xm direction) with respect to the swing axis Zr of the swing body 3. The local front space FSL is a space that includes the swing axis Zr and extends in the +Xm direction from the swing axis Zr. An installation state of the front camera 31 with respect to the swing body 3 and a viewing angle θ1 of the optical system of the front camera 31 are defined such that at least the local front space FSL is arranged in a capturing area (viewing area) of the optical system of the front camera 31.

The side image includes at least an image of a local side space which is orthogonal to the front direction (+Xm direction) and in the lateral direction (Ym-axis direction) with respect to the swing axis Zr of the swing body 3.

Among the side images, the first side image in the first lateral direction (+Ym direction) includes at least an image of a first local side space SS1L which is orthogonal to the front direction (+Xm direction) and in the first lateral direction (+Ym direction) with respect to the swing axis Zr of the swing body 3. The first local side space SS1L is a space that includes the swing axis Zr and extends in the +Ym direction from the swing axis Zr. An installation state of the first side camera 32 with respect to the swing body 3 and a viewing angle θ2 of the optical system of the first side camera 32 are defined such that at least the first local side space SS1L is arranged in a capturing area (viewing area) of the optical system of the first side camera 32.

Among the side images, the second side image in the second lateral direction (–Ym direction) includes at least an image of a second local side space SS2L which is orthogonal to the front direction (+Xm direction) and in the second lateral direction (–Ym direction) with respect to the swing axis Zr of the swing body 3. The second local side space SS2L is a space that includes the swing axis Zr and extends in the –Ym direction from the swing axis Zr. An installation state of the second side camera 33 with respect to the swing body 3 and a viewing angle θ3 of the optical system of the second side camera 33 are defined such that at least the second local side space SS2L is arranged in a capturing area (viewing area) of the optical system of the second side camera 33.

Incidentally, the viewing angle is an angle indicating a range of an object to be captured by the imaging device 30, and is an angle indicating a range reflected by an image sensor. The viewing angle is also referred to as an angle of view. The viewing angle includes an angle of view (horizontal angle of view) in the predetermined plane orthogonal to the swing axis Zr of the swing body 3. A range to be reflected becomes wide when the viewing angle is large, and the range to be reflected becomes narrow when the viewing angle is small. In addition, when a focal length of the optical system of the imaging device 30 changes, the viewing angle changes. The viewing angle increases as the focal length of the optical system is shorter, and the viewing angle decreases as the focal length of the optical system is longer. In the present embodiment, the focal length of the optical system of the imaging device 30 is fixed. That is, the optical system of the imaging device 30 is a fixed focus lens, and the imaging device 30 is a fixed focus camera in the present embodiment.

The display device 50 has the plurality of display screens adjacent to each other (the front display screen 51S, the first side display screen 52S, the second side display screen 53S, the upper side display screen 54S, and the lower side display screen 55S) as will be described below with reference to FIG. 5. The front image of the swing body 3 in the front direction is displayed on the front display screen 51S, the first side image of the swing body 3 in the first lateral direction (left direction) is displayed on the first side display screen 52S, and the second side image of the swing body 3 in the second lateral direction (right direction) is displayed on the second side display screen 53S such that the operator existing in the remote control facility can feel the sense of actually riding on the cab of the excavator 1. Since the front image includes at least the image of the local front space FSL, the first side image includes at least the image of the first local side space SS1L, and the second side image includes at least the image of the second local side space SS2L, the display system 200 can give the operator existing in the remote control facility the sense of actually riding on the cab of the excavator 1.

In addition, the operability of the remote control is improved since the first side image includes at least the image of the first local side space SS1L. When the operator actually rides on the cab of the excavator 1, the operator can visually recognize the first local side space SS1L only by changing an orientation of the head. On the other hand, when the operator exists in the remote control facility, it is difficult for the operator to visually recognize the first local side space SS1L even if changing the orientation of the head unless the image of the first local side space SS1L is displayed on the display device 50. In the present embodiment, the first side image including at least the image of the first local side space SS1L is displayed on the display device 50. Thus, the operator can visually recognize the first local side space SS1L by viewing the display device 50. The same description also applies to the second local side space SS2L.

In the present embodiment, the optical axis D1 of the optical system of the front camera 31 and the optical axis D2 of the optical system of the first side camera 32 are orthogonal to each other in the predetermined plane orthogonal to the swing axis Zr of the swing body 3. The optical axis D1 of the optical system of the front camera 31 and the optical axis D3 of the optical system of the second side camera 33 are orthogonal to each other in the predetermined plane orthogonal to the swing axis Zr of the swing body 3.

Each of the optical system of the front camera 31, the optical system of the first side camera 32, and the optical system of the second side camera 33 includes a wide-angle lens. Each of the viewing angle θ1 of the optical system of the front camera 31, the viewing angle θ2 of the optical system of the first side camera 32, and the viewing angle θ3 of the optical system of the second side camera 33 is between 70 degrees and 100 degrees.

In the present embodiment, the viewing angle θ1 of the optical system of the front camera 31 is 90 degrees. The viewing angle θ2 of the optical system of the first side camera 32 is 90 degrees. The viewing angle θ3 of the optical system of the second side camera 33 is 90 degrees.

The front camera 31 captures the front image representing an image of an object arranged in the capturing area defined based on the viewing angle θ1 among objects existing in the front space FS.

The first side camera 32 captures the first side image representing an image of an object arranged in the capturing area defined based on the viewing angle θ2 among the objects existing in the first side space SS1.

The second side camera 33 captures the second side image representing an image of an object arranged in the capturing area defined based on the viewing angle θ3 among the objects existing in the second side space SS2.

[Remote Control Facility]

Figure 5:
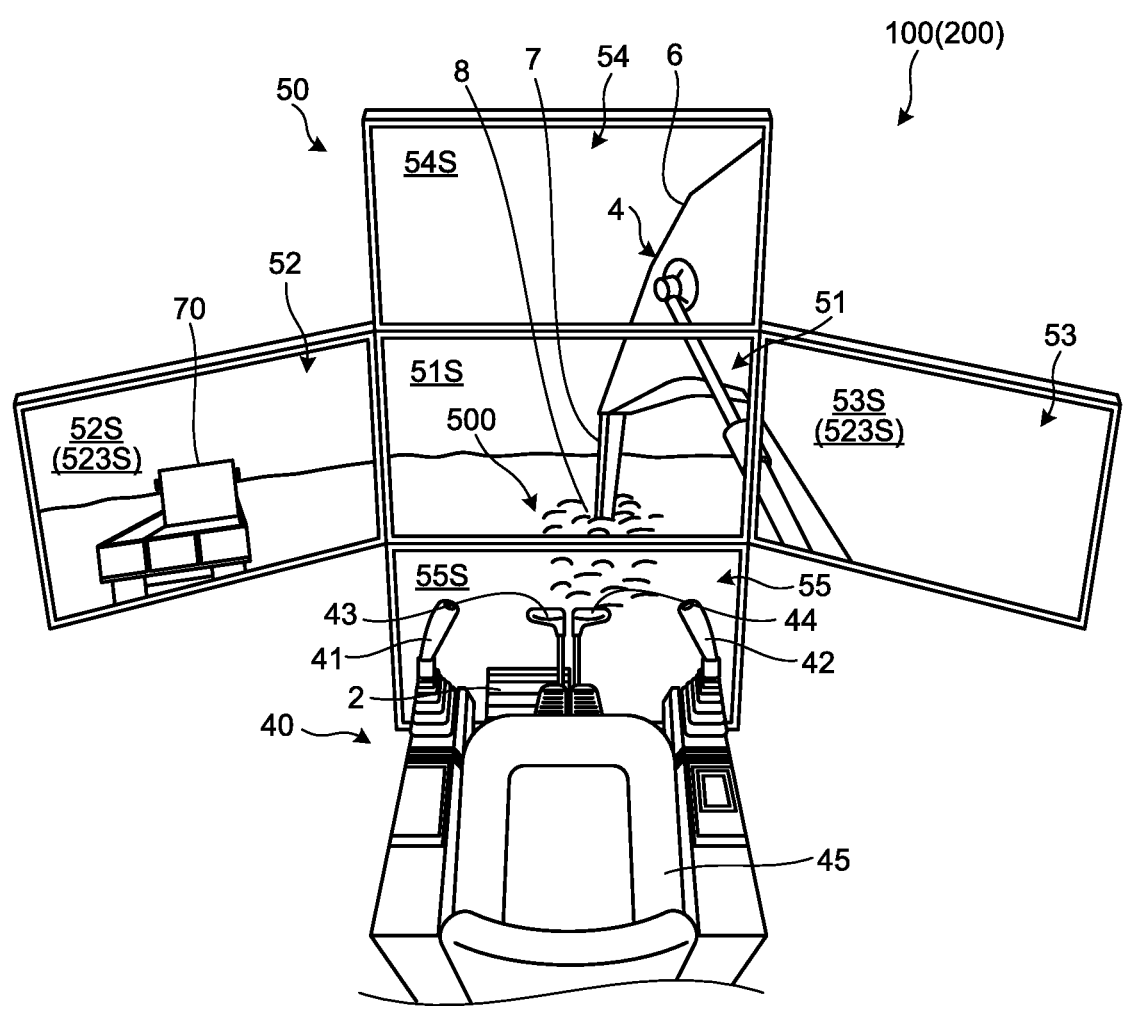
FIG. 5 is a view schematically illustrating an example of a remote control room provided in a remote control facility according to the first embodiment.

FIG. 5 is a view schematically illustrating an example of a remote control room provided in the remote control facility according to the present embodiment. As illustrated in FIG. 5, the remote control system 100 includes the remote control device 40 that remotely operates the excavator 1 and the display device 50. The remote control device 40 and the display device 50 are arranged in the remote control room.

The remote control device 40 is operated by the operator sitting on the control seat 45. The operator sits on the control seat 45 so as to face the display screen of the display device 50. The operator operates the remote control device 40 while viewing the display screen of the display device 50.

The operation signal generated by operating the remote control device 40 is transmitted to the control device 300 of the excavator 1 via the control device 60 and the communication system 400. The control device 300 operates the excavator 1 based on the operation signal acquired via the communication system 400. The operation of the excavator 1 includes at least one of an operation of the travel body 2, an operation of the swing body 3, and an operation of the working equipment 4.

The operation of the travel body 2 includes at least one of forward movement and backward movement of the crawler belt 2A. In addition, the operation of the travel body 2 includes at least one of forward movement and backward movement of the crawler belt 2B.

The operation of the swing body 3 includes at least one of a left swing and a right swing of the swing body 3.

The operation of the working equipment 4 includes at least one of a raising operation and a lowering operation of the boom 6. In addition, the operation of the working equipment 4 includes at least one of a dumping operation and an excavation operation of the arm 7. In addition, the operation of the working equipment 4 includes at least one of an excavation operation and a dumping operation of the bucket 8.

The remote control device 40 includes a left work lever 41 and a right work lever 42 which are operated for the operations of the swing body 3 and the working equipment 4 and a left travel lever 43 and a right travel lever 44 which are operated for the operation of the travel body 2.

The left work lever 41 is arranged on the left side of the control seat 45. The right work lever 42 is arranged at the right of the control seat 42. As the left work lever 41 is operated in the front-rear direction, the arm 7 performs the dumping operation or the excavation operation. As the left work lever 41 is operated in the left-right direction, the swing body 3 swings left or right. As the right work lever 42 is operated in the left-right direction, the bucket 8 performs the excavation operation or the dumping operation. As the right work lever 42 is operated in the front-rear direction, the boom 6 is lowered or raised. Incidentally, the swing body 3 may swing right or left when the left operation lever 41 is operated in the front-rear direction, and the arm 7 may perform the dumping operation or the excavation operation when the left operation lever 41 is operated in the left-right direction.

The left travel lever 43 and the right travel lever 44 are arranged in front of the control seat 45. The left travel lever 43 is arranged at the left of the right travel lever 44. As the left travel lever 43 is operated in the front-rear direction, the crawler belt 2A of the travel body 2 moves forward or backward. As the right travel lever 44 is operated in the front-rear direction, the crawler belt 2B of the travel body 2 moves forward or backward.

The display device 50 displays images of objects existing at a work site captured by the imaging device 30. Image data representing the images captured simultaneously by a plurality of the imaging devices 30 is simultaneously transmitted to the control device 60 of the remote control system 100 via the control device 300 and the communication system 400. The control device 60 causes the display devices 50 to simultaneously display the plurality of pieces of image data acquired via the communication system 400. As described above, the image captured by the imaging device 30 includes a video. The control device 60 causes the display device 50 to simultaneously display videos of objects at a work site captured simultaneously by the plurality of imaging devices 30.

The display device 50 includes a flat panel display such as a liquid crystal display (LCD) and an organic electroluminescence display (GELD). In the present embodiment, the display device 50 includes a plurality of the flat panel displays combined with each other. Each of the plurality of flat panel displays has a display screen to display an image of an object existing at a work site captured by the imaging device 30. In the present embodiment, the display device 50 includes five flat panel displays arranged adjacent to each other. The display device 50 includes a center flat panel display 51, a left flat panel display 52 arranged on the left side of the center flat panel display 51, a right flat panel display 53 arranged on the right side of the center flat panel display 51, an upper flat panel display 54 arranged above the center flat panel display 51, and a lower flat panel display 55 arranged below the center flat panel display 51.

In the present embodiment, the front image taken by the front camera 31 is displayed on the display screen 51S of the center flat panel display 51. The first side image captured by the first side camera 32 is displayed on the display screen 52S of the left flat panel display 52. The second side image captured by the second side camera 33 is displayed on the display screen 53S of the right flat panel display 53. The upper side image captured by the upper side camera 34 is displayed on the display screen 54S of the upper flat panel display 54. The lower side image captured by the lower side camera 35 is displayed on the display screen 55S of the lower flat panel display 55.

In the following description, the display screen 51S of the center flat panel display 51 on which the front image captured by the front camera 31 is displayed is appropriately referred to as the front display screen 51S, the display screen 52S of the left flat panel display 52 on which the first side image captured by the first side camera 32 is displayed is appropriately referred to as the first side display screen 52S, and the display screen 53S of the right flat panel display 53 on which the second side image captured by the second side camera 33 is displayed is appropriately referred to as the second side display screen 53S.

In addition, in the following description, the display screen 54S of the upper flat panel display 54 on which the upper side image captured by the upper side camera 34 is displayed is appropriately referred to as the upper side display screen 54S, and the display screen 55S of the lower flat panel display 55 on which the lower side image captured by the lower side camera 35 is displayed is appropriately referred to as the lower side display screen 55S.

In addition, the first side display screen 52S on which the first side image is displayed and the second side display screen 53S on which the second side image is displayed may be collectively referred to as side display screens 523S on which side images captured by the side camera 323 are displayed as appropriate. The side display screens 523S are provided side by side, respectively, at one end portion on the right side and the other end portion on the left side of the front display screen 51S.

As illustrated in FIG. 5, the first side display screen 52S is adjacent to the one end portion on the left side of the front display screen 51S. The second side display screen 53S is provided side by side at the other end portion of the right side of the front display screen 51S.

As illustrated in FIG. 5, the upper side display screen 54S is adjacent to one end portion on the upper side of the front display screen 51S. The lower side display screen 55S is provided side by side at the other end portion on the lower side of the front display screen 51S.

An angle formed between the front display screen 51S and the first side display screen 52S is larger than 90 degrees and smaller than 180 degrees. That is, the first side display screen 52S is directed to the operator sitting on the control seat 45. Similarly, an angle formed between the front display screen 51S and the second side display screen 53S is larger than 90 degrees and smaller than 180 degrees, and the second side display screen 53S is directed to the operator sitting on the control seat 45.

In addition, an angle formed between the front display screen 51S and the upper side display screen 54S is larger than 90 degrees and smaller than 180 degrees. That is, the upper side display screen 54S is directed to the operator sitting on the control seat 45. Similarly, an angle formed between the front display screen 51S and the lower side display screen 55S is larger than 90 degrees and smaller than 180 degrees, and the lower side display screen 55S is directed to the operator sitting on the control seat 45.

In this manner, the front display screen 51S, the first side display screen 52S, the second side display screen 53S, the upper side display screen 54S, and the lower side display screen 55S of the display device 50 are arranged so as to surround the control seat 45 on which the operator sits in the remote control facility. Thus, the operator existing in the remote control facility can view the image displayed on the display device 50 and obtain the sense of actually riding on the cab of the excavator 1.

In addition, the front image displayed on the front display screen 51S corresponds to the operator's view in the front direction when actually riding on the cab of the excavator 1. The first side image displayed on the first side display screen 51S corresponds to the operator's view in the left direction when actually riding on the cab of the excavator 1. The second side image displayed on the second side display screen 52S corresponds to the operator's view in the right direction when actually riding on the cab of the excavator 1. The upper side image displayed on the upper side display screen 54S corresponds to the operator's view in the obliquely upward direction of the front direction when actually riding on the cab of the excavator 1. The lower side image displayed on the lower side display screen 55S corresponds to the operator's view in the obliquely downward direction of the front direction when actually riding on the cab of the excavator 1. As the images corresponding to the view in the front direction, the view in the left direction, the view in the right direction, the view in the obliquely upward direction of the front direction, and the view in the obliquely downward direction of the front direction are displayed on the display device 50, the operator existing in the remote control facility can feel the sense of actually riding on the cab of the excavator 1. As a result, the operability of remote control is improved.

As illustrated in FIG. 5, the front image displayed on the front display screen 51S includes the arm 7 of the working equipment 4 and the bucket 8 of the working equipment 4 excavating the excavation object. The operator can recognize an excavation situation by the bucket 8 and an operation situation of the arm 7 by viewing the front image displayed on the front display screen 51S.

In addition, a dump truck 70, which is a transporter vehicle on which an excavated object excavated by the working equipment 4 is loaded, is displayed, as the first side image, on the first side display screen 52S in a state where an excavation object 500 is positioned in the front direction of the swing body 3 and the excavation object 500 and the bucket 8 are displayed on the front display screen 51S as the front image as illustrated in FIG. 5. The operator views the first side image displayed on the first side display screen 52S, and thus, can recognize the presence of the dump truck 70 while performing the excavation operation with the working equipment 4. In addition, after the excavation operation is finished in a state where the excavation object 500 is displayed on the front display screen 51S, the operator can recognize the presence of the dump truck 70 by viewing the first side display screen 52S before swinging the swing body 3 to the left.

During the 90-degree-swing excavation and loading work, the dump truck 70 is often positioned in the first local side space SS1L in a state where the excavation object 500 is positioned in the local front space FSL. As illustrated in FIG. 5, the first side image displayed on the first side display screen 52S includes at least the image of the first local side space SS1L in the first lateral direction (+Ym direction) with respect to the swing axis Zr. Thus, the operator views the first side image displayed on the first side display screen 52S, and thus, can recognize the presence of the dump truck 70 positioned in the first local side space SS1L while performing the excavation operation with the working equipment 4.

In addition, the second side image displayed on the second side display screen 53S includes the boom 6 of the working equipment 4 as illustrated in FIG. 5. The operator can recognize the operation situation by the boom 6 by viewing the second side image displayed on the second side display screen 53S. In addition, the operator can recognize relative positions between the bucket 8 and the arm 7 and the boom 6 by viewing the front image displayed on the front display screen 51S and the second side image displayed on the second side display screen 53S.

In addition, the excavation object 500 is displayed, as the second side image, on the second side display screen 53S in a state where the dump truck 70 is positioned in the front direction of the swing body 3 and the dump truck 70 is displayed, as the front image, on the front display screen 51S. The operator views the second side image displayed on the second side display screen 53S, and can recognize the excavation object 500 while performing the loading operation with the working equipment 4. In addition, after the loading operation is finished in a state where the dump truck 70 is displayed on the front display screen 51S, the operator can recognize the excavation object 500 by viewing the second side display screen 53S before swinging the swing body 3 to the right.

In addition, the upper side image displayed on the upper side display screen 54S includes an upper end portion of the working equipment 4 as illustrated in FIG. 5. The operator can recognize a position of the upper end portion of the working equipment 4 by viewing the upper side image displayed on the upper side display screen 54S. The operator recognizes a situation of the upper side space including the upper end portion of the working equipment 4, and thus, can operate the working equipment 4 such that the working equipment 4 does not come into contact with an obstacle when there is the obstacle in the upper side space.

In addition, the lower side image displayed on the lower side display screen 55S includes the ground between the bucket 8 and the travel body 2 of the working equipment 4 excavating the excavation object, and a part of the travel body 2 as illustrated in FIG. 5. The operator can recognize a situation of the ground between the bucket 8 and the travel body 2 by viewing the lower side image displayed on the lower side display screen 55S. The operator recognizes a situation of the lower side space including the ground, and thus, can operate the travel body 2 such that the travel body 2 does not come into contact with an obstacle when there is the obstacle in the lower side space.

[Display System]

Figure 6:
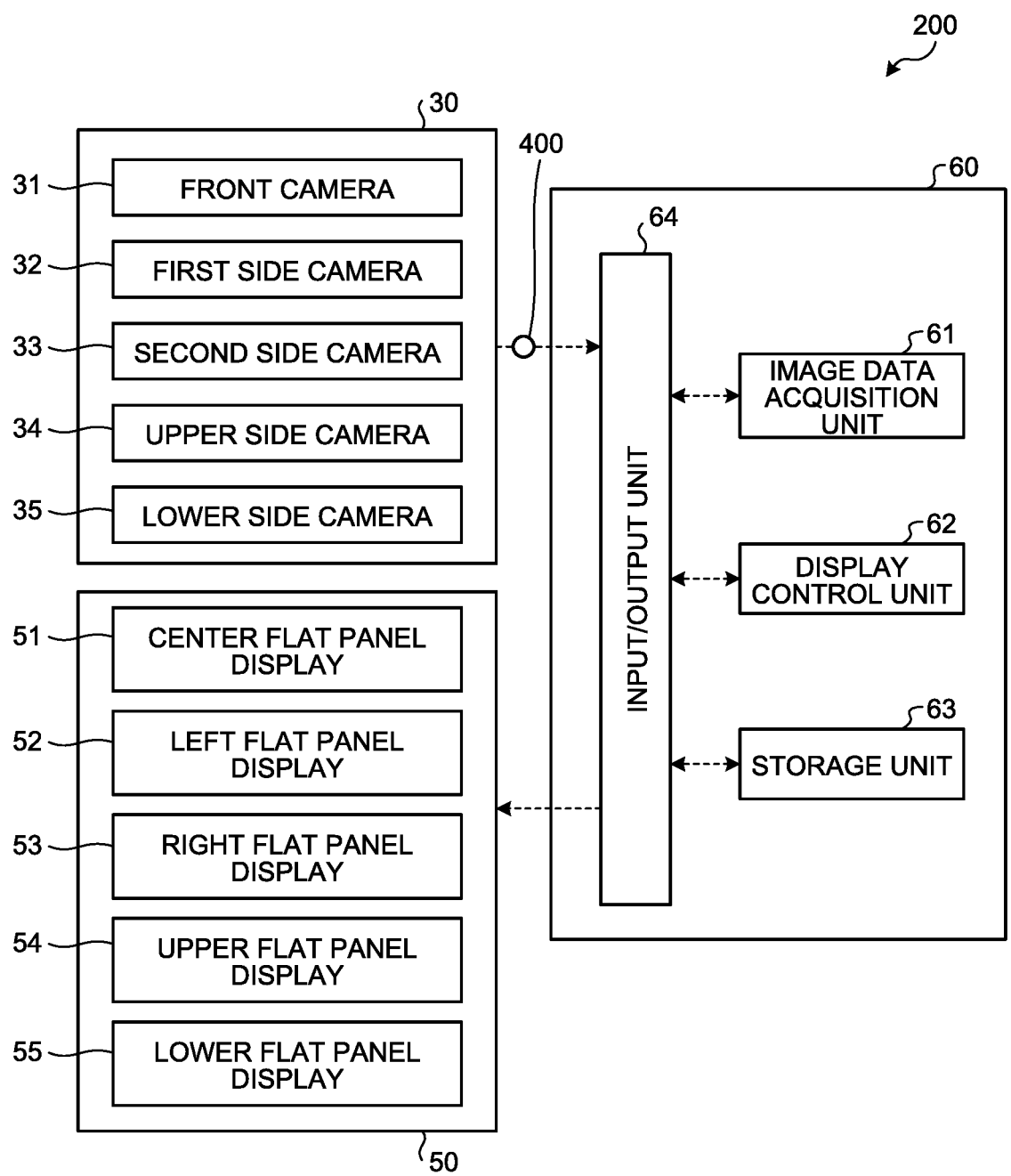
FIG. 6 is a functional block diagram illustrating an example of a display system according to the first embodiment.

FIG. 6 is a functional block diagram illustrating an example of the display system 200 according to the present embodiment. As illustrated in FIG. 6, the display system 200 includes the display device 50 provided in the remote control facility and the control device 60.

The control device 60 includes a computer system. The control device 60 includes: an arithmetic processing device including a processor such as a central processing unit (CPU); a storage device including a volatile memory such as a random access memory (RAM) and a nonvolatile memory such as a read only memory (ROM); and an input/output interface.

An image of a work site captured by the imaging device 30 is transmitted to the control device 60 via the communication system 400.

The control device 60 includes an image data acquisition unit 61, a display control unit 62, a storage unit 63, and an input/output unit 64.

The image data acquisition unit 61 acquires the front image of the swing body 3 in the front direction including at least the image of the local front space FSL in the front direction with respect to the swing axis Zr and the side image of the swing body 3 in the lateral direction including at least the image of the local side space in the lateral direction orthogonal to the front direction with respect to the swing axis Zr, which have been simultaneously captured by the imaging device 30 mounted on the excavator 1, from the imaging device 30 via the communication system 400.

The front image and the side image simultaneously captured by the imaging device 30 including the front camera 31 and the side camera 323 are simultaneously transmitted from the imaging device 30 to the image data acquisition unit 61 via the communication system 400. The front image and the side image are transmitted to the image data acquisition unit 61 at a prescribed sampling cycle. The image data acquisition unit 61 simultaneously acquires the front image and the side image that are simultaneously captured and transmitted from the imaging device 30 in synchronization at the prescribed sampling cycle.

In the present embodiment, the image data acquisition unit 61 simultaneously acquires the front image of the swing body 3 in the front direction including at least the image of the local front space FSL in the front direction with respect to the swing axis Zr, the first side image of the swing body 3 in the first lateral direction including at least the image of the first local side space SS1L orthogonal to the front direction and in the first lateral direction with respect to the swing axis Zr, the second image of the swing body 3 in the second lateral direction including at least the image of the second local side space SS2L orthogonal to the front direction and in the second lateral direction opposite to the first lateral direction with respect to the swing axis Zr, the upper side image of the swing body 3 in the obliquely upward direction of the front direction, and the lower side image of the swing body 3 in the obliquely downward direction of the front side.

The display control unit 62 simultaneously displays the front image and the side image simultaneously acquired by the image data acquisition unit 61 on the front display screen 51S and the side display screen 523S of the display device 50.

In the present embodiment, the display control unit 62 causes the display device 50 to simultaneously display the front image, the first side image, the second side image, the upper side image, and the lower side image which have been acquired by the image data acquisition unit 61.

The display control unit 62 displays the front image captured by the front camera 31 on the front display screen 51S, displays the first side image captured by the first side camera 32 on the first side display screen 52S, and displays the second side image captured by the second side camera 33 on the second side display screen 53S.

In addition, the display control unit 62 displays the upper side image captured by the upper side camera 34 on the upper side display screen 54S and displays the lower side image taken by the lower side camera 35 on the lower side display screen 55S.

The display control unit 62 simultaneously displays the front image, the first side image, the second side image, the upper side image, and the lower side image, which have been acquired by the image data acquisition unit 61, on the front display screen 51S of the display device 50, the first side display screen 52S of the display device 50 adjacent to one end portion of the front display screen 51S, the second side display screen 53S of the display device 50 adjacent to the other end portion of the front display screen 51S, the upper side display screen 54S of the display device 50 adjacent to an upper end portion of the front display screen 51S, and the lower side display screen 55S of the display device 50 adjacent to a lower end portion of the front display screen 51S.

[Display Method]

Figure 7:
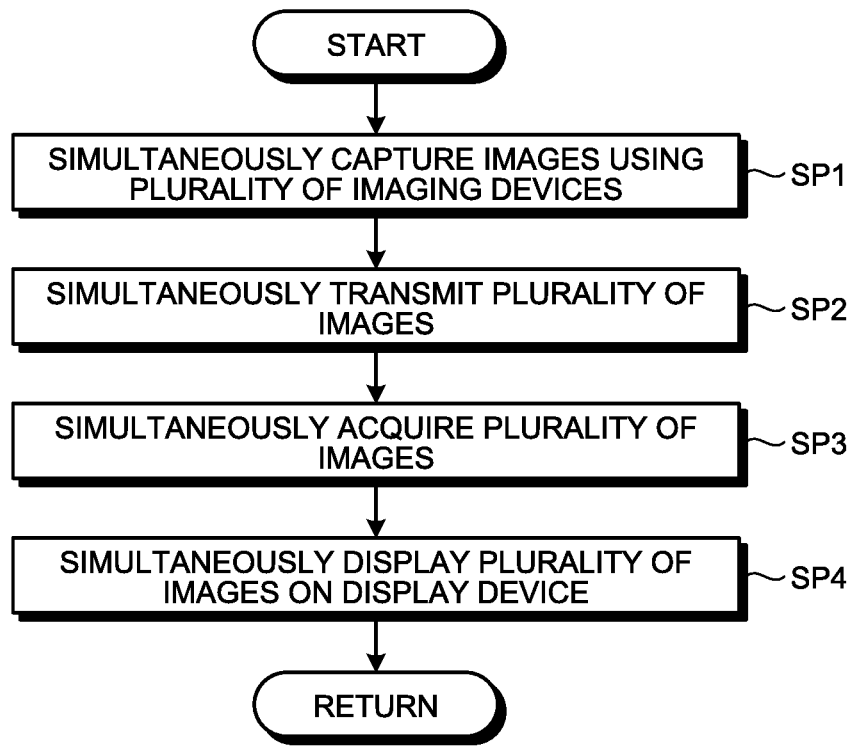
FIG. 7 is a flowchart illustrating an example of a display method using the display system according to the first embodiment.

FIG. 7 is a flowchart illustrating an example of a display method using the display system 200 according to the present embodiment. A process of the display method illustrated in FIG. 7 is performed at a prescribed sampling cycle.

When the imaging device 30 and the excavator 1 are activated so that the remote control system 100 including the display system 200 is activated, the plurality of imaging devices 30 (31, 32, 33, 34, and 35) simultaneously capture objects existing at a work site (Step SP1).

The control device 300 of the excavator 1 simultaneously transmits a plurality of images (the front image, the first side image, the second side image, the upper side image, and the lower side image) respectively captured by the plurality of imaging devices 30 to the control device 60 of the display system 200 via the communication system 400 (Step SP2).

The image data acquisition unit 61 of the control device 60 simultaneously acquires the plurality of images transmitted from the excavator 1 (Step SP3).

The display control unit 62 causes the display device 50 to simultaneously display the plurality of images acquired by the image data acquisition unit 61 (Step SP4). The display control unit 62 simultaneously performs a process of displaying the front image transmitted from the front camera 31 on the front display screen 51S, a process of displaying the first side image transmitted from the first side camera 32 on the first side display screen 52S, a process of displaying the third side image transmitted from the second side camera 33 on the third side display screen 53S, a process of displaying the upper side image transmitted from the upper side camera 34 on the upper side display screen 54S, and a process of displaying the lower side image transmitted from the lower side camera 35 on the lower side display screen 55S.

[90-Degree-Swing Excavation and Loading Work]

Figure 8:
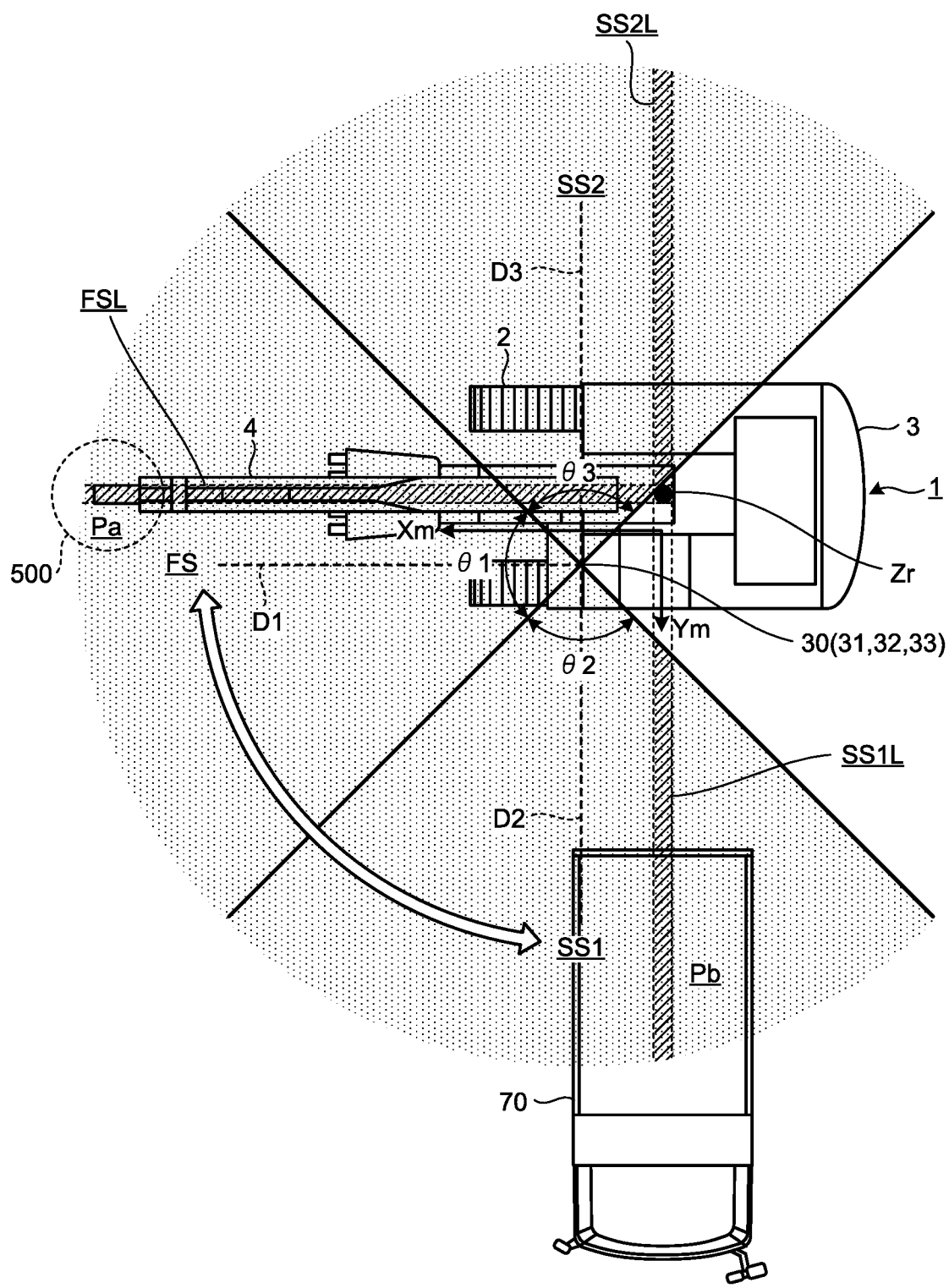
FIG. 8 is a schematic view for describing an example of an operation of the work machine according to the first embodiment.

Next, an example of the operation of the excavator 1 according to the present embodiment will be described. FIG. 8 is a schematic view for describing an example of the operation of the excavator 1 according to the present embodiment. FIG. 8 is a schematic view of the excavator 1 as viewed from above. As described with reference to FIG. 4, the front camera 31 captures the capturing area defined based on the viewing angle θ1. The first side camera 32 captures the capturing area defined based on the viewing angle θ2. The second side camera 33 captures the capturing area defined based on the viewing angle θ3.

FIG. 8 illustrates an example in which the excavator 1 performs the 90-degree-swing excavation and loading work. The 90-degree-swing excavation and loading work refers to work of excavating the excavation object 500 existing in the front direction of the swing body 3 using the working equipment 4 and holding the excavated object using the bucket 8, and then, swinging the swing body 3 substantially 90 degrees in a prescribed direction about the swing axis Zr and loading the excavated object held by the bucket 8 into a bed of the dump truck 70 which is the transporter vehicle. After the excavated object is loaded into the bed of the dump truck 70, the work of swinging the swing body 3 substantially 90 degrees in the opposite direction of the prescribed direction about the swing axis Zr such that the excavation object is positioned in the front direction of the swing body 3 and excavating the excavation object 500 using the working equipment 4 is performed again. In the present embodiment, the swing of the swing body 3 in the prescribed direction is a left swing, and the swing of the swing body 3 in the opposite direction of the prescribed direction is a right swing. The swing body 3 starts to swing left or right from a state where the swing is stopped.

The operation of excavating the excavation object 500 using the working equipment 4, the operation of swinging the swing body 3 by 90 degrees in the prescribed direction (the left swing), the operation of loading the excavated object into the bed of the dump truck 70, and the operation of swinging the swing body 3 in the opposite direction by 90 degrees (the right swing) are repeated, for example, until the bed of the dump truck 70 is full. In the 90-degree-swing excavation and loading work, the travel body 2 does not substantially operate, and the working equipment 4 and the swing body 3 operate. Incidentally, for example, the travel body 2 may operate in part of the 90-degree-swing excavation and loading work in order to adjust an excavation position.

In the 90-degree-swing excavation and loading work, the excavation object 500 is positioned in the front direction (+Xm direction) with respect to the swing axis Zr of the swing body 3, and the dump truck 70 is positioned in the first lateral direction (+Ym direction) with respect to the swing axis Zr of the swing body 3 as illustrated in FIG. 8. The bucket 8 is positioned at an excavation position Pa of the excavation object 500 in a state where the excavation object 500 is positioned in the front direction (+Xm direction) with respect to the swing axis Zr of the swing body 3. The excavator 1 excavates the excavation object 500 using the bucket 8 of the working equipment 4 at the excavation position Pa of the excavation object 500. After the working equipment 4 excavates the excavation object 500 at the excavation position Pa of the excavation object 500, the swing body 3 swings 90 degrees in the prescribed direction (the left swing) such that the working equipment 4 excavating at the excavation position Pa is arranged at a loading position Pb prescribed on the bed of the dump truck 70. After the bucket 8 of the working equipment 4 is positioned at the loading position Pb, the excavator 1 dumps the excavated object held in the bucket 8 at the loading position Pb from the bucket 8. As a result, the excavated object is loaded at the loading position Pb.

The loading position Pb includes a target stop position indicating a target position at which the swing body 3 swinging left is stopped after the end of the excavation operation. The excavation position Pa includes a target stop position indicating a target position at which the swing body 3 swinging right is stopped after the end of the loading operation.

When the excavation position Pa is located in the front direction (+Xm direction) with respect to the swing axis Zr of the swing body 3 in a state where the swing body 3 is stopped before the start of the swing (left swing) of the swing body 3 in the prescribed direction, the loading position Pb is located in the first lateral direction (+Ym direction) with respect to the swing axis Zr of the swing body 3 as illustrated in FIG. 8. That is, when the excavation object 500 is positioned in the local front space FSL forward with respect to the swing axis Zr, the dump truck 70 is positioned at the loading position Pb defined in the first local side space SS1L in the first lateral direction with respect to the swing axis Zr. As a result, the 90-degree-swing excavation and loading work is smoothly performed.

When the excavation operation using the working equipment 4 is performed at the excavation position Pa in the front direction with respect to the swing axis Zr, the working equipment 4 performing the excavation operation at the excavation position Pa is displayed as the front image on the front display screen 51S of the display device 50 as illustrated in FIG. 5. In addition, when the excavation operation using the working equipment 4 is performed at the excavation position Pa, the dump truck 70 arranged at the loading position Pb in the first lateral direction with respect to the swing axis Zr is displayed as the first side image on the first side display screen 52S of the display device 50. That is, the loading position Pb, which is the target stop position in the left swing of the swing body 3, is displayed on the display device 50 as the first side image in a state where the excavation position Pa is positioned in the front direction with respect to the swing axis Zr of the swing body 3 and the swing body 3 is stopped.

In the case of carrying out the 90-degree-swing excavation and loading work by remote control, the operator is likely to feel uncomfortable if the image of the dump truck 70 positioned at the loading position Pb in the first lateral direction with respect to the swing axis Zr of the swing body 3 is not displayed on the display device 50 when the excavation position Pa of the excavation object 500 is positioned in the front direction with respect to the swing axis Zr of the swing body 3, but the image of the dump truck 2 positioned at the loading position Pb suddenly appears on the display device 50 after the start of the swing of the swing body 3. In addition, if the image of the dump truck 70 positioned at the loading position Pb in the first lateral direction with respect to the swing axis Zr of the swing body 3 is not displayed on the display device 50 when the excavation position Pa of the excavation object 500 is positioned in the front direction with respect to the swing axis Zr of the swing body 3, the operator is likely to feel anxious about swinging the swing body 3 because the target stop position in the swing of the swing body 3 is not known. When the operator feels uncomfortable or anxious, there is a high possibility of operating the remote control device 40 to swing the swing body 3 at a low speed. The decrease in speed of swinging of the swing body 3 swings results in a decrease in working efficiency.

In the present embodiment, the front image including at least the image in the front direction with respect to the swing axis Zr of the swing body 3 and the first side image including at least the image in the first lateral direction with respect to the swing axis Zr of the swing body 3 are simultaneously captured by the imaging device 30. In addition, the display device 50 simultaneously displays the front image and the first side image including the target stop position in the left swing of the swing body 3 captured by the imaging device 30. As a result, when the excavation position Pa of the excavation object 500 is positioned in the front direction with respect to the swing axis Zr of the swing body 3, the image of the dump truck 70 positioned at the loading position Pb defined in the first lateral direction with respect to the swing axis Zr of the swing body 3 is displayed on the display device 50. Therefore, the operator can visually recognize the target stop position in the swing of the swing body 3, and thus, can comfortably perform remote control of the excavator 1 without feeling uncomfortable nor anxious. Since the excavation position Pa and the loading position Pb are simultaneously displayed on the display device 50, and the feeling of uncomfortable or anxious is suppressed, the operator can operate the remote control device 40 such that the swing body 3 swings at a high speed after the excavation operation at the excavation position Pa is finished. Therefore, the decrease in work efficiency is suppressed.

[Evaluation Test]

Figure 9:
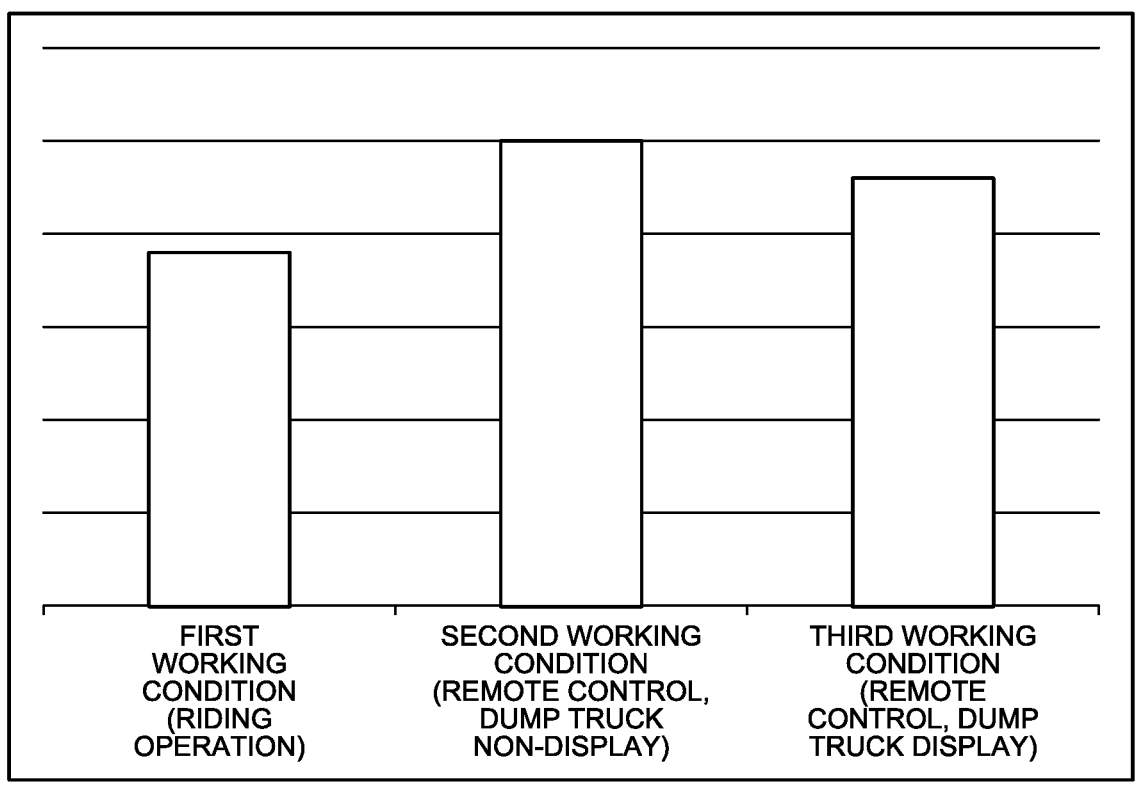
FIG. 9 is a view illustrating a result of an evaluation test of the display system according to the first embodiment.

FIG. 9 is a view illustrating a result of an evaluation test of the display system 200 according to the present embodiment. In the evaluation test, the 90-degree-swing excavation and loading work was carried out under three different working conditions.

A first working condition is a working condition in which an operator riding on a cab of the excavator 1 operates an operating device provided in the cab of the excavator 1 to carry out the 90-degree-swing excavation and loading work. That is, the excavator 1 is not remotely operated under the first working condition.

A second working condition is a working condition in which the excavation position Pa and the loading position Pb are not simultaneously displayed on the display device 50 of the remote control room although the excavator 1 is remotely operated. That is, under the second working condition, the image of the dump truck 70 is not displayed on the display device 50 when the excavation position Pa of the excavation object 500 is positioned in the front direction with respect to the swing axis Zr of the swing body 3. An installation state of the imaging device 30 with respect to the swing body 3 used under the second working condition is the same as the installation state of the imaging device 30 described in the above embodiment, the optical axis D1 of the optical system of the front camera 31 is parallel to the Xm axis, the optical axis D2 of the optical system of the first side camera 32 is parallel to the Ym axis, and the optical axis D3 of the optical system of the second side camera 33 is parallel to the Ym axis. Each viewing angle of the optical system of the imaging device 30 (the front camera 31, the first side camera 32, and the second side camera 33) used under the second working condition is 60 degrees.

A third working condition is a working condition according to the present embodiment. That is, in the remote control of the excavator 1, the excavation position Pa and the loading position Pb are simultaneously displayed on the display device 50 present in the remote control facility. Under the third working condition, the image of the dump truck 70 positioned at the loading position Pb defined in the first lateral direction with respect to the swing axis Zr of the swing body 3 is displayed on the display device 50 when the excavation position Pa of the excavation object 500 is positioned in the front direction with respect to the swing axis Zr of the swing body 3. A viewing angle of the imaging device 30 used under the third working condition is 90 degrees.

Under each of the three working conditions, a work time required until full-loading of the bed of the dump truck 70 since the start of the 90-degree-swing excavation and loading work was measured. FIG. 9 is a histogram illustrating the work time required for each of the three working conditions. As illustrated in FIG. 9, it has been confirmed that a work time based on the third working condition is shorter than a work time based on the second working condition. As described above, the operator can operate the remote control device 40 such that the swing body 3 swings left at a high speed by displaying the image of the dump truck 70 on the display device 50 when the excavation position Pa of the excavation object 500 is positioned in the front direction of the swing body 3. Since the swing body 3 swings left at the high speed, it is possible to confirm that the work time based on the third working condition is shorter than the work time based on the second working condition. In the present evaluation test, it was possible to obtain an effect that the work time based on the third working condition is reduced to about 30% of a difference between a work time based on the first working condition and the work time based on the second working condition as compared to the work time based on the second working condition.

[Effect]

As described above, the front image and the side image simultaneously captured by the imaging device 30 mounted on the excavator 1 are simultaneously displayed on the display device 50 existing outside the excavator 1 according to the present embodiment. Therefore, the operator remotely operating the excavator 1 can comfortably perform the remote control of the excavator 1 without feeling uncomfortable nor anxious. Therefore, the decrease in work efficiency is suppressed.

In addition, the swing body 3 swings left such that the working equipment 4 having excavated at the excavation position Pa is arranged at the loading position Pb, and the loading position Pb is located in the first lateral direction with respect to the swing axis Zr when the excavation position Pa is located in the front direction with respect to the swing axis Zr in the state where the swing body 3 is stopped according to the present embodiment. In the 90-degree-swing excavation and loading work, the dump truck 70 is often positioned at the loading position Pb defined in the first lateral direction with respect to the swing axis Zr in a state where the loading position Pa of the excavation object 500 is positioned in the local front space FSL in the front direction with respect to the swing axis Zr. In the present embodiment, the excavation position Pa (the excavation object 500) positioned in the front direction with respect to the swing axis Zr and the loading position Pb (a dump truck 700) positioned in the first lateral direction with respect to the swing axis Zr are simultaneously displayed on the display device 50 during the 90-degree-swing excavation and loading work. Thus, the operator is suppressed from feeling uncomfortable or anxious.

When the left swing starts, the excavation position Pa and the loading position Pb, which is the target stop position in the left swing of the swing body 3, are simultaneously displayed on the display device 50, and the target stop position in the left swing of the swing body 3 can be visually recognized, and thus, the operator can operate the remote control device 40 such that the swing body 3 swings left at the high speed after finishing the excavation operation at the excavation position Pa. Therefore, the decrease in work efficiency is suppressed.

In addition, according to the present embodiment, the front image including at least the image of the local front space FSL in the front direction with respect to the swing axis Zr is displayed on the front display screen 51S, and the first side image including at least the image of the first local side space SS1L in the first lateral direction with respect to the swing axis Zr is displayed on the first side display screen 52S. As a result, the operator existing in the remote control facility can obtain the sense of actually riding on the cab of the excavator 1. The front image displayed on the front display screen 51S corresponds to the operator's view in the front direction when actually riding on the cab of the excavator 1. The first side image displayed on the first side display screen 52S corresponds to the operator's view in the left direction when actually riding on the cab of the excavator 1. Since the images respectively corresponding to the view in the front direction and the view in the left direction of the operator actually riding on the cab of the excavator 1 are displayed on the display device 50, the operator existing in the remote control facility can obtain the sense of actually riding on the cab of the excavator 1. As a result, the operability of remote control is improved.

In addition, the operability of remote control is improved since the first side image includes at least the image of the first local side space SS1L in the first lateral direction with respect to the swing axis Zr according to the present embodiment. When the operator actually rides on the cab of the excavator 1, the operator can visually recognize the dump truck 70 existing in the first lateral direction with respect to the swing axis Zr only by changing the orientation of the head in the state where the excavation object 500 exists in the front direction with respect to the swing axis Zr. On the other hand, when the operator exists in the remote control facility, it is difficult for the operator to visually recognize the dump truck 70 existing in the first local side space SS1L in the first lateral direction with respect to the swing axis Zr even if changing the orientation of the head unless the image of the first local side space SS1L is displayed on the display device 50.

In the present embodiment, an installation state of the first side camera 32 with respect to the swing body 3 and the viewing angle θ2 of the optical system of the first side camera 32 are defined such that at least the first local side space SS1L is arranged in the capturing area of the optical system of the first side camera 32, and the first side image including at least the image of the first local side space SS1L is displayed on the display device 50. Therefore, the operator can visually recognize the dump truck 70 existing in the first local side space SS1L in the first lateral direction with respect to the swing axis Zr by viewing the display device 50. As a result, the operability of remote control is improved.

In addition, the front image is the image of the front space of the swing body 3 including the distal end portion of the working equipment 4 in the present embodiment. Thus, the operator can recognize an excavation situation using the bucket 8 provided at the distal end portion of the working equipment 4 by viewing the front image. In addition, the first side image is the image of the first side space of the swing body 3 that does not include the working equipment 4. Therefore, when the dump truck 70 exists in the first side space, the operator views the first side image and can smoothly recognize the presence of the dump truck 70 without being interrupted by the working equipment 4.

In addition, the image data acquisition unit 61 acquires the second side image in the second lateral direction of the swing body 3 opposite to the first lateral direction with respect to the swing axis Zr from the imaging device 30 according to the present embodiment. The display control unit 62 causes the display device 50 to simultaneously display the front image, the first side image, and the second side image which have been acquired by the image data acquisition unit 61. Since the front image and the second side image are simultaneously displayed on the display device 50, the operator is further suppressed from feeling uncomfortable or anxious in the 90-degree-swing excavation and loading work. During the 90-degree-swing excavation and loading work, the excavation object 500 is positioned in the second local side space SS2L in the second lateral direction with respect to the swing axis Zr in a state where the dump truck 70 is positioned in the local front space FSL in the front direction with respect to the swing axis Zr. That is, in a state where the loading position Pb is positioned in the front direction with respect to the swing axis Zr of the swing body 3 and the swing body 3 is stopped, the excavation position Pa, which is a target stop position in the right swing of the swing body 3, is displayed on the display device 50 as the second side image.

In the present embodiment, the dump truck 70 (the loading position Pb) positioned in the front direction with respect to the swing axis Zr and the excavation object 500 (the excavation position Pa) positioned in the second lateral direction with respect to the swing axis Zr are simultaneously displayed on the display device 50 during the 90-degree-swing excavation and loading work. Thus, the operator can visually recognize the excavation object 500 by viewing the display device 50 before swinging the swing body 3 to the right after finishing the loading operation in the state where the dump truck 70 is positioned in the front direction of the swing axis Zr.

When the right swing starts, the loading position Pb and the excavation position Pa which is the target stop position in the right swing of the swing body 3 are simultaneously displayed on the display device 50, and it is possible to visually recognize the target stop position in the right swing of the swing body 3. Thus, the operator does not feel uncomfortable nor anxious and can operate the remote control device 40 such that the excavation position Pa is positioned in the front direction with respect to the swing axis Zr of the swing body 3 so as to swing the swing body 3 to the right at a high speed. Therefore, the decrease in work efficiency is suppressed.

In addition, according to the present embodiment, the front image including at least the image of the local front space FSL in the front direction with respect to the swing axis Zr is displayed on the front display screen 51S, and the second side image including at least the image of the second local side space SS2L in the second lateral direction with respect to the swing axis Zr is displayed on the second side display screen 53S. As a result, the operator existing in the remote control facility can obtain the sense of actually riding on the cab of the excavator 1. The second side image displayed on the second side display screen 53S corresponds to the operator's view in the right direction when actually riding on the cab of the excavator 1. Since the images respectively corresponding to the view in the front direction, the view in the left direction, and the view in the right direction of the operator actually riding on the cab of the excavator 1 are displayed on the display device 50, the operator existing in the remote control facility can obtain the sense of actually riding on the cab of the excavator 1. As a result, the operability of remote control is improved.

In addition, the second side image is the image of the second side space of the swing body 3 including the proximal end portion of the working equipment 4. As a result, the operator can recognize the operation situation of the boom 6 by viewing the second side image. In addition, the operator can recognize relative positions of the bucket 8, the arm 7 and the boom 6 by viewing the front image and the second side image.

In addition, the imaging device 30 includes the front camera 31 that captures the front direction and the side camera 323 that captures the lateral direction according to the present embodiment. The display device 50 includes the front display screen 51S and the side display screen 523S adjacent to the end portion of the front display screen 51S.

The display control unit 62 displays the front image captured by the front camera 31 on the front display screen 51S, and displays the side image captured by the side camera 323 on the side display screen 523S. As a result, it is possible to display the images indicating a situation of the work site on the display device 50 without performing advanced image processing.

In addition, the optical axis D1 of the optical system of the front camera 31 and the optical axis D2 of the optical system of the first side camera 32 are orthogonal to each other in the predetermined plane orthogonal to the swing axis Zr of the swing body 3 according to the present embodiment. In addition, the optical axis D1 of the optical system of the front camera 31 and the optical axis D3 of the optical system of the second side camera 33 are orthogonal to each other in the predetermined plane orthogonal to the swing axis Zr of the swing body 3. As a result, the side camera 323 can acquire an image in an obliquely backward direction with respect to the swing axis Zr of the swing body 3. The display device 50 can display a situation around the excavator 1 over a wide range.

In addition, each of the viewing angle θ1 of the optical system of the front camera 31, the viewing angle θ2 of the optical system of the first side camera 32, and the viewing angle θ3 of the optical system of the second side camera 33 is between 70 degrees and 100 degrees according to the present embodiment. If the angle is smaller than 70 degrees, for example, there is a possibility that it is difficult for the first side image to cover the first local side space SS1L, that is, there is a possibility that the dump truck at the loading position is not visually recognizable. In addition, if the angle is larger than 100 degrees, for example, the first side image is displayed in a reduced size to display a wide range, which makes it difficult to view or requires a large display. When a wide-angle lens is adopted as the optical system of the front camera 31 and the optical system of the side camera 323, the display device 50 can display the situation around the excavator 1 over the wide range.

Second Embodiment

A second embodiment will be described. In the following description, constituent elements that are the same as or equivalent to those in the above-described embodiment will be denoted by the same reference numerals, and the description thereof will be simplified or omitted.

In the above-described embodiment, the optical axis D1 and the optical axis D2 are orthogonal to each other, and the optical axis D1 and the optical axis D3 are orthogonal to each other, in the predetermined plane orthogonal to the swing axis Zr. In the predetermined plane orthogonal to the swing axis Zr, the optical axis D1 and the optical axis D2 are not necessarily orthogonal to each other, and the optical axis D1 and the optical axis D3 are not necessarily orthogonal to each other. In addition, at least one of the viewing angle θ1, the viewing angle θ2, and the viewing angle θ3 may be smaller than 90 degrees, or may be larger than 90 degrees.

Figure 10:
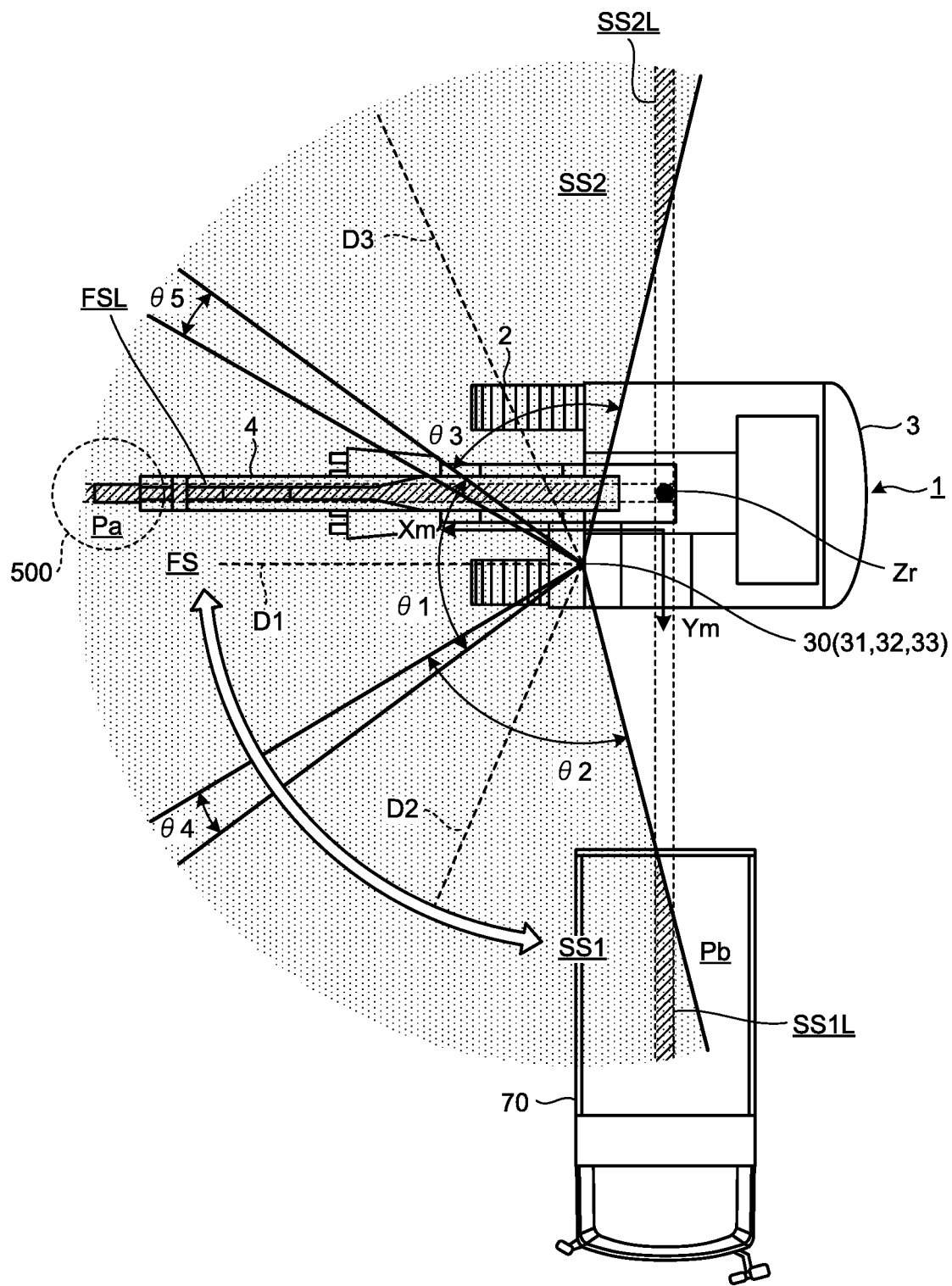
FIG. 10 is a schematic view for describing a capturing area of a camera according to a second embodiment.

FIG. 10 is a schematic view for describing a capturing area of the imaging device 30 according to the present embodiment.

An installation state of the front camera 31 with respect to the swing body 3 and the viewing angle θ1 of an optical system of the front camera 31 are defined such that a front image includes at least an image of the local front space FSL in the front direction (+Xm direction) with respect to the swing axis Zr of the swing body 3.

In addition, an installation state of the first side camera 32 with respect to the swing body 3 and the viewing angle θ2 of an optical system of the first side camera 32 are defined such that the first side image includes at least an image of the first local side space SS1L in the first lateral direction (+Ym direction) with respect to the swing axis Zr of the swing body 3.

In addition, an installation state of the second side camera 33 with respect to the swing body 3 and the viewing angle θ3 of an optical system of the second side camera 33 are defined such that a second side image includes at least an image of the second local side space SS2L in the second lateral direction (−Ym direction) with respect to the swing axis Zr of the swing body 3.

In the example illustrated in FIG. 10, each of the viewing angle θ1 of the front camera 31, the viewing angle θ2 of the first side camera 32, and the viewing angle θ3 of the second side camera 32 is smaller than 90 degrees. Each of the viewing angle θ1 and the viewing angles θ2 and θ3 is, for example, 70 degrees.

An optical axis D1 of the optical system of the front camera 31 is substantially parallel to the Xm axis. In a predetermined plane orthogonal to the Zm axis, an angle formed between the optical axis D1 of the optical system of the front camera 31 and the optical axis D2 of the optical system of the first side camera 32 is smaller than 90 degrees. In the predetermined plane orthogonal to the Zm axis, an angle formed between the optical axis D1 of the optical system of the front camera 31 and the optical axis D3 of the optical system of the second side camera 33 is smaller than 90 degrees. The angle formed between the optical axis D1 and the optical axis D2 is, for example, 67 degrees. The angle formed between the optical axis D1 and the optical axis D3 is, for example, 67 degrees.

A capturing area of the front camera 31 overlaps a part of a capturing area of the first side camera 32 in a range of an angle θ4. The capturing area of the front camera 31 overlaps a part of a capturing area of the second side camera 32 in a range of an angle θ5. The angle θ4 and the angle θ5 are, for example, 3 degrees.

The front image captured by the front camera 31 is displayed on the front display screen 51S. The first side image captured by the first side camera 32 is displayed on the first side display screen 52S. The second side image captured by the second side camera 33 is displayed on the second side display screen 53S.

Even in the present embodiment, the first side image includes at least an image of the first local side space SS1L in which the dump truck 70 is positioned when the working equipment 4 is positioned at the excavation position Pa. Therefore, the operator can operate the remote control device 40 such that the swing body 3 swings left at a high speed after finishing an excavation operation at the excavation position Pa, in the 90-degree-swing excavation and loading work.

In addition, the second side image includes at least an image of the second local side space SS2L in which the excavation object 500 is positioned when the working equipment 4 is positioned at the loading position Pb even in the present embodiment. Therefore, the operator can operate the remote control device 40 such that the swing body 3 swings right at a high speed after finishing a loading operation at the loading position Pb, in the 90-degree-swing excavation and loading work.

In addition, the capturing area of the front camera 31 overlaps a part of the capturing area of the first side camera 32, and the capturing area of the front camera 31 overlaps a part of the capturing area of the second side camera 32 in the present embodiment. Therefore, generation of a non-capturing space, which is not captured by the imaging device 30, is suppressed in a space in the front direction of the first local side space SS1L and the second local side space SS2L out of a space around the excavator 1.

The non-capturing space is a space which is not displayed on the display device 50 and is a blind spot that is not viewable by the operator existing in a remote control facility. The capturing area of the front camera 31 and the capturing area of the first side camera 32 are separated, and a discontinuous portion is generated between the front image and the first side image displayed on the display device 50 if the non-capturing space is generated. Similarly, the capturing area of the front camera 31 and the capturing area of the second side camera 33 are separated, and a discontinuous portion is generated between the front image and the second side image displayed on the display device 50 if the non-capturing space is generated. As a result, the operator viewing the display device 50 is likely to feel uncomfortable when the swing body 3 is swinging.

In the present embodiment, the capturing area of the front camera 31 overlaps a part of the capturing area of the first side camera 32. Thus, the generation of the discontinuous portion between the front image and the first side image displayed on the display device 50 is suppressed. Similarly, the capturing area of the front camera 31 overlaps a part of the capturing area of the second side camera 32. Thus, the generation of the discontinuous portion between the front image and the second side image displayed on the display device 50 is suppressed. Therefore, the operator viewing the display device 50 is suppressed from feeling uncomfortable when the swing body 3 is swinging.

Incidentally, it has been assumed that the front image is acquired by the front camera 31 and the side image is acquired by the side camera 323 in each of the above-described embodiments. The imaging device 30 may have an optical system capable of collectively acquiring an optical image in the front direction of the swing body 3 and an optical image in the first lateral direction of the swing body 3. For example, when an ultra-wide-angle lens or a fisheye lens is adopted as the optical system, the imaging device 30 can collectively acquire the optical image in the front direction of the swing body 3 and the optical image in the lateral direction of the swing body 3. The display control unit 62 may perform image processing on the images captured by the imaging device 30 to divide the images into a front image and a side image, display the front image on the front display screen 51S, and display the side image on the side display screen 523S. As a result, the number of the imaging devices 30 to be mounted on the excavator 1 can be reduced.

Incidentally, it has been assumed that the front image, the first side image, and the second side image are acquired in each of the above-described embodiments. The second side image is not necessarily acquired. The acquisition of the second side image can be omitted in the case of carrying out work using a so-called single-sided loading method in which an excavation operation and a loading operation are carried out by repeating an operation of swinging the swing body 3 by 90 degrees in a prescribed direction and an operation of swinging the swing body 3 by 90 degrees in the opposite direction. When the second side image is not displayed on the display device 50, it is difficult for the operator to visually recognize the excavation object 500 (excavation position Pa) even if viewing the display device 50 before swinging the swing body 3 to the right after finishing the loading operation in a state where the dump truck 70 (the loading position Pb) is positioned in the front direction of the swing axis Zr. However, when the excavation object 500 is, for example, a hill, the influence on the bucket 8 and the excavation object 500 is small even if the swing body 3 is vigorously swung to the right so that the bucket 8 collides with the excavation object 500. Thus, the operator can operate the remote control device 40 to swing the swing body 3 to the right at a high speed even if the second side image is not displayed on the display device 50 and the excavation object 500 is not displayed on the display device 50 before swinging the swing body 3 to the right. Therefore, the decrease in work efficiency is suppressed.

On the other hand, when the first side image is not displayed on the display device 50, it is difficult for the operator to visually recognize the dump truck 70 (the loading position Pb) even if viewing the display device 50 before swinging the swing body 3 to the left after finishing the excavation operation in a state where the excavation object 500 (the excavation position Pa) is positioned in the front direction of the swing axis Zr. When it is difficult to visually recognize the dump truck 70 even by viewing the display device 50 before swinging the swing body 3 to the left, at least one of the working equipment 4 and the dump truck 70 is likely to be damaged if the swing body 3 is vigorously swung to the left so that the bucket 8 collides with the dump truck 70. Thus, when the first side image is not displayed on the display device 50, the operator operates the remote control device 40 such that the swing body 3 swings left at a low speed. In this case, the work efficiency is decreased. According to the present embodiment, the first side image is displayed on the display device 50, and thus, the operator can swing the swing body 3 to the left at the high speed while suppressing the contact between the working equipment 4 and the dump truck 70 after finishing the excavation operation. Therefore, the decrease in work efficiency is suppressed.

On the other hand, when the second side image is displayed on the display device 50, the operator can view the excavation object 500 (the excavation position Pa) by viewing the display device 50 before swinging the swing body 3 to the right after finishing the loading operation. The operator views the second side image and can operate the remote control device 40 to swing the swing body 3 to the right at the high speed without feeling uncomfortable nor anxious after finishing the loading operation. Therefore, the decrease in work efficiency is suppressed.

In addition, the operator can comfortably carry out work using a so-called double-sided loading method since both the first side image and the second side image are displayed on the display device 50. Incidentally, the work using the double-sided loading method refers to work of sequentially repeating an operation of excavating the excavation object 400, an operation of swinging the swing body 3 to the left to load an excavated object into a first dump truck, and an operation of swinging the swing body 3 to the right to load the excavated object into a second dump truck using the single excavator 1 in a state where the excavation object 500 is positioned in the front direction of the swing body 3, the first dump truck is positioned in the first lateral direction of the swing body 3, and the second dump truck positioned in the second lateral direction of the swing body 2. In the case of carrying out the work using the double-sided loading method, not only the front image and the first side image but also the second side image is displayed on the display device 50, and thus, both an image of the first dump truck and an image of the second dump truck are displayed on the display device 50 when the excavation position Pa of the excavation object 500 is positioned in the front direction of the swing body 3. As a result, the operator can comfortably carry out the work using the double-sided loading method while viewing the display device 50.

Incidentally, the front image and the second side image may be acquired, and the first side image is not necessarily acquired in each of the above-described embodiments. There is a possibility that the loading position Pb is positioned in the second lateral direction with respect to the swing axis Zr in a state where the excavation position Pa is positioned in the front direction with respect to the swing axis Zr depending on a structure of the work machine 1. In such a case, the operator can operate the remote control device 40 to swing the swing body 3 at the high speed without feeling uncomfortable nor anxious since the front image and the second side image are displayed on the display device 50.

Incidentally, it has been assumed that the side display screen 523S is adjacent to the end portion of the front display screen 51S in each of the above-described embodiments. The front display screen 51S and the side display screen 523S may be separated.

Incidentally, the example in which the display device 50 includes the plurality of screens has been described in each of the above-described embodiments. The display device 50 may be configured to display the front image or the side image on one curved screen, for example.

Incidentally, it has been assumed that the work machine 1 is the excavator in each of the above-described embodiments. The work machine 1 may be provided with a swing body and a working equipment supported by the swing body, and is not limited to the excavator.

REFERENCE SIGNS LIST

1 EXCAVATOR (WORK MACHINE)
2 TRAVEL BODY
2A CRAWLER BELT
2B CRAWLER BELT
3 SWING BODY
4 WORKING EQUIPMENT
6 BOOM
7 ARM
8 BUCKET
10 BOOM CYLINDER
11 ARM CYLINDER
12 BUCKET CYLINDER
30 IMAGING DEVICE
31 FRONT CAMERA
32 FIRST SIDE CAMERA
33 SECOND SIDE CAMERA
34 UPPER SIDE CAMERA
35 LOWER SIDE CAMERA
40 REMOTE CONTROL DEVICE
41 LEFT WORK LEVER
42 RIGHT WORK LEVER
43 LEFT TRAVEL LEVER
44 RIGHT TRAVEL LEVER
45 CONTROL SEAT
50 DISPLAY DEVICE
51 CENTER FLAT PANEL DISPLAY
51S FRONT DISPLAY SCREEN
52 LEFT FLAT PANEL DISPLAY
52S FIRST SIDE DISPLAY SCREEN
53 RIGHT FLAT PANEL DISPLAY
53S SECOND SIDE DISPLAY SCREEN

54 UPPER FLAT PANEL DISPLAY
54S UPPER SIDE DISPLAY SCREEN
55 LOWER FLAT PANEL DISPLAY
55S LOWER SIDE DISPLAY SCREEN
60 CONTROL DEVICE
61 IMAGE DATA ACQUISITION UNIT
62 DISPLAY CONTROL UNIT
63 STORAGE UNIT
64 INPUT/OUTPUT UNIT
70 DUMP TRUCK
100 REMOTE CONTROL SYSTEM
200 DISPLAY SYSTEM
300 CONTROL DEVICE
400 COMMUNICATION SYSTEM
401 WIRELESS COMMUNICATION DEVICE
500 EXCAVATION OBJECT
Pa EXCAVATION POSITION
Pb LOADING POSITION
FS FRONT SPACE
FSL LOCAL FRONT SPACE
SS1 FIRST SIDE SPACE
SS1L FIRST LOCAL SIDE SPACE
SS2 SECOND SIDE SPACE
SS2L SECOND LOCAL SIDE SPACE
θ1 VIEWING ANGLE
θ2 VIEWING ANGLE
θ3 VIEWING ANGLE.

The invention claimed is:

1. A display system comprising:
an image data acquisition unit that acquires a front image and a side image captured by an imaging device mounted on a work machine having a swing body swingably supported by a travel body about a swing axis and working equipment supported by the swing body, the front image including at least an image in a front direction with respect to the swing axis, the front image being captured by a front camera of the imaging device; and
the side image including at least an image in a lateral direction with respect to the swing axis, the lateral direction being orthogonal to the front direction, the side image being captured by a side camera of the imaging device;
a display device existing outside the work machine;
a remote control device existing outside the work machine, the remote control device being operated by an operator sitting on a control seat; and
a display control unit that displays the front image and the side image acquired by the image data acquisition unit on a display screen of the display device,
wherein the work machine carries out a swing excavation and loading work in which the work machine operates the working equipment and the swing body to load an excavated object on a loading target after an excavation work in which the work machine excavates an excavation object with the working equipment,
in the swing excavation and loading work, the side image includes a captured image of the work machine in a swing direction and a captured image in a direction opposite to the swing direction, and
the display control unit displays the side image with the front image on the display device, and
the side camera includes a first side camera that captures a left direction of the swing body and a second side camera that captures a right direction of the swing body, and
a second side image captured by the second side camera includes an image of the working equipment, and
an optical axis of an optical system of the front camera and an optical axis of an optical system of the side camera are arranged in a common predetermined plane.

2. The display system according to claim 1, wherein
the display screen of the display device includes a front display screen, a first side display screen, and a second side display screen, and
the front display screen, the first side display screen, and the second side display screen are arranged so as to surround the control seat.

3. The display system according to claim 2, wherein
an angle formed between the front display screen and the first side display screen is larger than 90 degrees and smaller than 180 degrees, and
an angle formed between the front display screen and the second side display screen is larger than 90 degrees and smaller than 180 degrees.

4. The display system according to claim 1, wherein
an image displayed on the display screen of the display device includes an image of the travel body of the work machine supporting the swing body.

5. A display method comprising:
acquiring a front image and a side image captured by an imaging device mounted on a work machine having a swing body swingably supported by a travel body about a swing axis and working equipment supported by the swing body, the front image including at least an image in a front direction with respect to the swing axis, the front image being captured by a front camera of the imaging device; and
the side image including at least an image in a lateral direction with respect to the swing axis, the lateral direction being orthogonal to the front direction, the side image being captured by a side camera of the imaging device;
a display device existing outside the work machine;
a remote control device existing outside the work machine, the remote control device being operated by an operator sitting on a control seat; and
displaying the front image and the side image on a display screen of the display device,
wherein the work machine carries out a swing excavation and loading work in which the work machine operates the working equipment and the swing body to load an excavated object on a loading target after an excavation work in which the work machine excavates an excavation object with the working equipment,
in the swing excavation and loading work, the side image includes a captured image of the work machine in a swing direction and a captured image in a direction opposite to the swing direction, and
the display control unit displays the side image with the front image on the display device, and
the side camera includes a first side camera that captures a left direction of the swing body and a second side camera that captures a right direction of the swing body, and
a second side image captured by the second side camera includes an image of the working equipment, and
an optical axis of an optical system of the front camera and an optical axis of an optical system of the side camera are arranged in a common predetermined plane.

6. A remote control system comprising:
an imaging device that is mounted on a work machine having a swing body swingably supported by a travel body about a swing axis and working equipment supported by the swing body and captures a front image including at least an image in a front direction with respect to the swing axis, the front image being captured by a front camera of the imaging device; and a side image including at least an image in a lateral direction with respect to the swing axis, the lateral direction being orthogonal to the front direction, the side image being captured by a side camera of the imaging device;

a display device existing outside the work machine; and a remote control device existing outside the work machine and communicates with the work machine, the remote control device being operated by an operator sitting on a control seat, wherein the remote control device comprises:

an image data acquisition unit that acquires the front image and the side image from the imaging device; and a display control unit that displays the front image and the side image acquired by the image data acquisition unit on a display screen of the display device, wherein the work machine carries out a swing excavation and loading work in which the work machine operates the working equipment and the swing body to load an excavated object on a loading target after an excavation work in which the work machine excavates an excavation object with the working equipment, in the swing excavation and loading work, the side image includes a captured image of the work machine in a swing direction and a captured image in a direction opposite to the swing direction, and the display control unit displays the side image with the front image on the display device, and the side camera includes a first side camera that captures a left direction of the swing body and a second side camera that captures a right direction of the swing body, and a second side image captured by the second side camera includes an image of the working equipment, and an optical axis of an optical system of the front camera and an optical axis of an optical system of the side camera are arranged in a common predetermined plane.

* * * * *